(12) United States Patent
Peterffy

(10) Patent No.: US 11,494,843 B2
(45) Date of Patent: *Nov. 8, 2022

(54) COMPUTERIZED METHOD AND SYSTEM FOR ACCUMULATION AND DISTRIBUTION OF SECURITIES

(71) Applicant: Interactive Brokers LLC, Greenwich, CT (US)

(72) Inventor: Thomas Pechy Peterffy, Greenwich, CT (US)

(73) Assignee: INTERACTIVE BROKERS LLC, Greenwich, CT (US)

(*) Notice: Subject to any disclaimer, the term of this patent is extended or adjusted under 35 U.S.C. 154(b) by 496 days.

This patent is subject to a terminal disclaimer.

(21) Appl. No.: 16/430,038

(22) Filed: Jun. 3, 2019

(65) Prior Publication Data
US 2019/0378214 A1     Dec. 12, 2019

Related U.S. Application Data

(63) Continuation of application No. 12/540,914, filed on Aug. 13, 2009, now Pat. No. 10,311,519, which is a
(Continued)

(51) Int. Cl.
*G06Q 40/06* (2012.01)
*G06Q 40/04* (2012.01)

(52) U.S. Cl.
CPC ........... *G06Q 40/06* (2013.01); *G06Q 40/04* (2013.01)

(58) Field of Classification Search
CPC ............................... G06Q 40/06; G06Q 40/04
See application file for complete search history.

(56) References Cited

U.S. PATENT DOCUMENTS 4,677,552 A    6/1987   Sibley, Jr.
6,983,260 B2   1/2006   Hummelgren
(Continued)

FOREIGN PATENT DOCUMENTS

EP    2465088 A1      6/2012
WO    2010/045353 A2  4/2010
WO    2011/019969 A1  2/2011

OTHER PUBLICATIONS

E. K. Clemons and B. W. Weber, "Restructuring institutional block trading: an overview of the OptiMark system," Proceedings of the Thirty-First Hawaii International Conference on System Sciences, 1998, pp. 301-310 vol. 6, doi: 10.1109/HICSS.1998.654787 ("Clemons") (Year: 1998).*
(Continued)

*Primary Examiner* — Bennett M Sigmond
*Assistant Examiner* — Bolko M Hamerski
(74) *Attorney, Agent, or Firm* — Brown Rudnick LLP; Ian G. DiBernardo

(57) ABSTRACT

Disclosed embodiments include computer-implemented methods and systems that permit a market participant to automatically trade a relatively large order block order to accumulate or distribute securities as multiple, relatively smaller, component orders based on order parameters and subject to conditions for the placing and/or execution of such component orders. The component orders may continue automatically, without the need for further intervention from the market participant, until the total quantity specified by the market participant is accumulated or distributed.

20 Claims, 13 Drawing Sheets

Related U.S. Application Data continuation-in-part of application No. 12/251,316, filed on Oct. 14, 2008, now abandoned.

(56) References Cited

U.S. PATENT DOCUMENTS

| | | | |
|---|---|---|---|
| 7,251,629 | B1 | 7/2007 | Marynowski et al. |
| 7,340,430 | B2 | 3/2008 | Mulinder et al. |
| 7,418,416 | B2 | 8/2008 | Guidi et al. |
| 7,447,655 | B2 | 11/2008 | Brumfield et al. |
| 7,552,085 | B2 | 6/2009 | Amburn |
| 7,574,391 | B1 | 8/2009 | Monroe et al. |
| 7,680,722 | B2 | 3/2010 | Bok et al. |
| 7,685,038 | B2 | 3/2010 | Stevens et al. |
| 7,716,121 | B2 | 5/2010 | Walsky et al. |
| 7,827,092 | B2 | 11/2010 | Chait et al. |
| 7,848,992 | B2 | 12/2010 | Turner |
| 7,885,882 | B1 | 2/2011 | Brander et al. |
| 7,890,417 | B2 | 2/2011 | Hanson et al. |
| 7,966,249 | B1 | 6/2011 | Dawson et al. |
| 8,046,290 | B2 | 10/2011 | Fitzpatrick et al. |
| 8,069,106 | B2 | 11/2011 | Waelbroeck et al. |
| 8,108,299 | B1 * | 1/2012 | Waelbroeck ......... G06Q 40/025 705/37 |
| 8,165,954 | B2 | 4/2012 | Waelbroeck et al. |
| 8,612,329 | B1 | 12/2013 | Steidlmayer et al. |
| 2001/0044771 | A1 | 11/2001 | Usher et al. |
| 2002/0055901 | A1 | 5/2002 | Gianakouros et al. |
| 2002/0069156 | A1 | 6/2002 | Adam et al. |
| 2002/0099651 | A1 | 7/2002 | May |
| 2003/0033235 | A1 | 2/2003 | Hummelgren |
| 2003/0033239 | A1 * | 2/2003 | Gilbert ................. G06Q 40/04 705/37 |
| 2003/0069826 | A1 | 4/2003 | Guidi et al. |
| 2003/0078865 | A1 | 4/2003 | Lee |
| 2003/0115128 | A1 | 6/2003 | Lange et al. |
| 2004/0015431 | A1 | 1/2004 | May |
| 2004/0177024 | A1 | 9/2004 | Bok et al. |
| 2004/0210511 | A1 | 10/2004 | Waelbroeck et al. |
| 2005/0044034 | A1 | 2/2005 | Perry et al. |
| 2005/0228741 | A1 | 10/2005 | Liebowitz |
| 2005/0246261 | A1 | 11/2005 | Stevens et al. |
| 2006/0015436 | A1 | 1/2006 | Burns et al. |
| 2006/0085320 | A1 | 4/2006 | Owens et al. |
| 2006/0100953 | A1 | 5/2006 | Downs, II |
| 2006/0116943 | A1 | 6/2006 | Willain |
| 2006/0167779 | A1 | 7/2006 | Turner |
| 2006/0235785 | A1 | 10/2006 | Chait et al. |
| 2007/0038550 | A1 | 2/2007 | Caille et al. |
| 2007/0150407 | A1 | 6/2007 | Gilboy |
| 2007/0198391 | A1 * | 8/2007 | Dreyer ............... G06Q 30/0601 705/37 |
| 2007/0288343 | A1 | 12/2007 | Reinkensmeyer et al. |
| 2008/0077539 | A1 * | 3/2008 | Drain ................... G06Q 40/04 705/37 |
| 2008/0097893 | A1 * | 4/2008 | Walsky ............... G06Q 40/025 705/37 |
| 2008/0249960 | A1 | 10/2008 | Amburn |
| 2008/0275808 | A1 | 11/2008 | Mackay |
| 2009/0089199 | A1 * | 4/2009 | Waelbroeck ......... G06Q 50/188 705/37 |
| 2009/0099952 | A1 * | 4/2009 | Wahlberg .............. G06Q 40/00 705/37 |
| 2010/0091772 | A1 | 4/2010 | Peterffy |
| 2013/0006832 | A1 | 1/2013 | Peterffy |

OTHER PUBLICATIONS

International Search Report and Written Opinion dated Aug. 11, 2014 in International Application No. PCT/US09/60671.

International Search Report and Written Opinion dated Oct. 13, 2010 in International Application No. PCT/US10/45390.

Extended European Search Report dated Oct. 22, 2014 in European Patent Application No. 10808791.7.

* cited by examiner

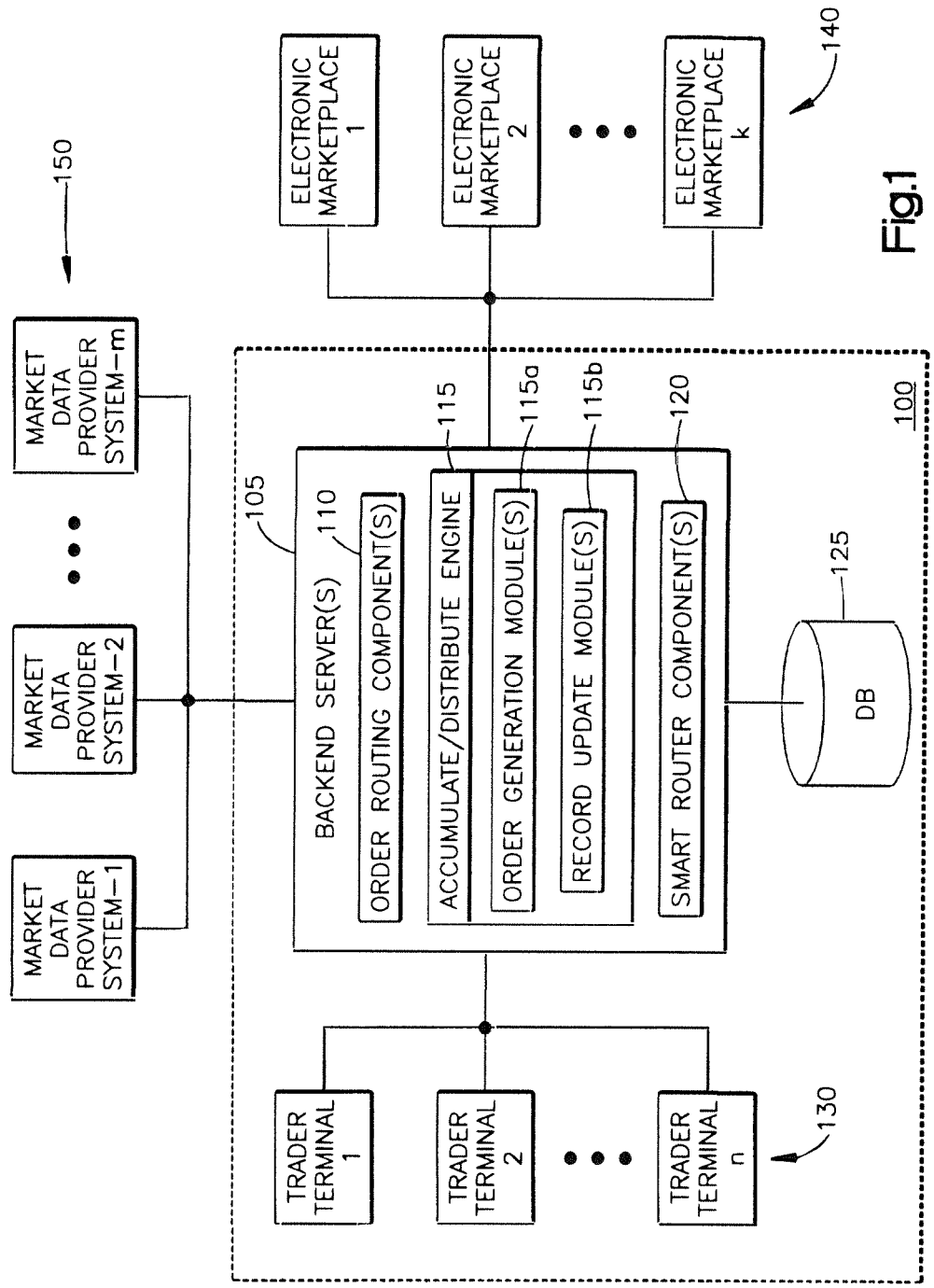

Parameters

BUY ▽ 5,000 total shares in increments 200 every 25 Minutes ▽ ▽ [118.6900] +/- offset -.01 and
Order Type REL ▽ Set order price to bid .02 but not higher than ASK Start Time _____ end Time _____
☑ Wait for current order to fill before submitting next order ☑ Randomize time period by +/-20%
☑ Catch up in time ☑ Randomize size by +/- 55%

☑ Allow this order to be filled outside of regular trading hours
if the offer size is 600 or higher, then take entire offer (up to number of shares remaining)

Fig.3

COMPUTERIZED METHOD AND SYSTEM FOR ACCUMULATION AND DISTRIBUTION OF SECURITIES

CROSS REFERENCE TO RELATED APPLICATIONS

This application is a continuation of U.S. patent application Ser. No. 12/540,914, filed Aug. 13, 2009, now U.S. Pat. No. 10,311,519, which is a continuation-in-part of and claims priority to to U.S. patent application Ser. No. 12/251,316, filed Oct. 14, 2008, now abandoned, each of which is incorporated by reference herein in its entirety.

BACKGROUND OF THE INVENTION

Field of the Invention

The present invention relates to the field of securities trading systems and, in particular, to a computer-implemented system and method for accumulating and distributing large volumes of securities.

Description of Related Art

A market participant (also referred to herein as a trader) that desires to accumulate or sell a large position in a stock generally will not submit a single buy/sell order because exposing a large order often causes adverse price effects to the disadvantage of the market participant. Traders employ various methods and strategies to minimize these adverse price effects, including manually breaking up the large order into smaller incremental orders and working the small orders over a period of time. Accumulating and distributing large positions in this manner requires constant monitoring and human intervention. However, such monitoring and intervention can be impractical, if not impossible, given the number and complexity of the factors affecting trading in a security and, in any event, would be costly and prone to errors, particularly when accumulating or distributing multiple different securities. Also, manually handling smaller incremental orders would be much too slow in electronic markets. Thus, a need exists for an improved method and system for accumulating and distributing large volumes of securities.

SUMMARY

These and other needs are satisfied by the embodiments disclosed herein. In general, embodiments described herein include computer-implemented methods and systems that permit a trader to automatically trade large volumes of securities in smaller, component orders by specifying order parameters and/or conditions. The methods and systems for automatic creation of component orders may be combined with any number of optional features, including the ability to randomize the size of each component order and the time between each component order.

BRIEF DESCRIPTION OF THE FIGURES

By way of example, embodiments of the invention will be shown in and described with reference to the accompanying drawings, in which:

FIG. 1 is a schematic diagram of a computer-implemented trading network in accordance with an embodiment of the present invention;

FIGS. 2a-c are screen shots of a trader terminal in accordance with an embodiment of the present invention;

FIG. 3 is a portion of a screen shot showing a parameters panel according to an embodiment of the present invention;

DETAILED DESCRIPTION OF EMBODIMENTS

Figure 4:
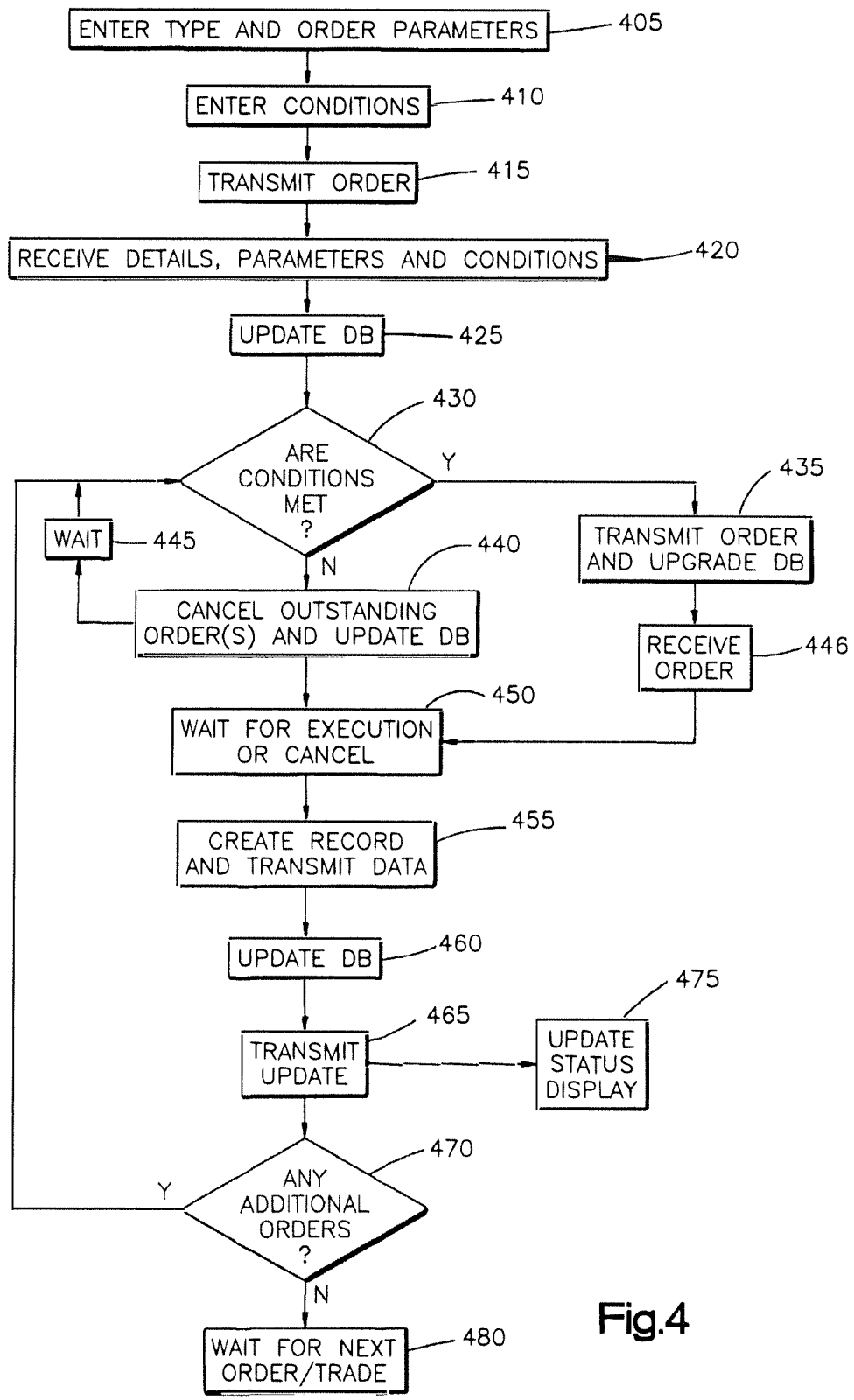
FIG. 4 is a flow diagram of the process of creating and trading orders in accordance with an embodiment of the present invention.

In general, certain computer-implemented embodiments of the invention permit a market participant to accumulate (buy) or distribute (sell) a large number of securities by automatically transmitting relatively smaller trade component orders that are based on order parameters (such as price and size) and that are placed only upon satisfaction of order conditions provided by the market participant until the total number of shares specified by the market participant is accumulated or distributed. The market participant can initiate the orders being submitted to electronic marketplaces as market, limit or relative (also referred to as pegged to primary) orders. Other optional features discussed herein may be combined with such automatic creation of the accumulate/distribute trade component orders.

As will be apparent to those skilled in the art based on the present disclosure, various embodiments of the present invention offer one or more advantages over, and solve one or more business and technical problems associated with, prior manual and electronic trading systems and methods. For example, embodiments of the present invention prevent deteriorating prices by automatically dividing and submitting a large volume order in smaller increments, while permitting the market participants to set order parameters and conditions to the placing or execution of component orders once and have them applicable to up to all of the component orders. Embodiments of the present invention allow a trader to randomize submission time and the size of the component orders, thereby mitigating the risk that the trader's strategy (i.e., accumulating or distributing a large amount of a particular security) will be detected by other market participants, who may attempt to take advantage of the existence of the large order, taking a position ahead of the larger order and push the price in a profitable direction.

Furthermore, manually dividing a large order into component orders and submitting and monitoring the constituent component orders can stretch the resulting trades over a relatively large period of time, thereby increasing market risks, such as exposing the security to potential price fluctuations as a result of company news, a move in the broader market or other factors. Certain embodiments of the present invention provide the trader with various options for addressing this risk. For example, traders may be given the option to condition the submission of orders on the absence of relevant news stories in a specified time window. Traders also may be permitted to control the speed and frequency with which component orders are placed, such as setting the time between component orders, providing the option to delay submission of a component order until after the prior component order has been filled, and the option to place additional orders to "catch up" if execution of component orders falls behind schedule. Thus, embodiments of the present invention may automate the process and may reduce the time to work the large order and its constituent component orders, even when taking into account multiple, complex factors, thereby reducing market risk.

Embodiments of the invention are not limited to working and dividing a single block order at a time. Embodiments of the present invention allow a single trader to easily and effectively manage multiple large volume orders simultaneously, including simultaneously working orders on both the buy and sell sides to implement various trading strategies.

From a technology perspective, certain embodiments of the invention may also avoid bandwidth limitations and communication interruptions by automatically splitting a large order into multiple orders based on as few as a single order transmission. Embodiments of the present invention minimize the amount of human intervention required to trade large volume orders, for example, by automatically generating multiple component orders based on a single order ticket, thereby reducing costs and errors.

Various embodiments of the present invention will now be described in greater detail with reference to the aforementioned figures. Turning first to FIG. 1, there is shown an embodiment of a computer-implemented trading system 100 generally comprising one or more backend servers 105 and trader terminals (1, 2, . . . n) 130. In certain embodiments, the backend servers 105 serve as an intermediary between trader terminals 130 and electronic marketplaces (1, 2, . . . k) 140, receiving trade order details from the trader terminals 130, processing them, and submitting trade orders based thereon to the electronic marketplaces 140. The backend servers 105 also receive order execution information from the electronic marketplaces 140, process the execution information, and provide execution details to the trader terminals 130. In performing such functions, the backend servers 105 also receive and utilize market data, such as current market prices for securities, received from market data provider systems (1, 2, . . . m) 150.

It is to be understood that the present invention is applicable to multiple asset classes, including, but not limited to financial products traded on organized exchanges such as securities, commodity futures, and foreign exchange. As used herein, the term security is meant to encompass the foregoing as well as other existing and hereafter created securities and asset classes. Accordingly, the electronic marketplaces 140 may include any market or exchange for the trading of securities, such as that provided by the New York Stock Exchange Euronext, Boston Options Exchange, Chicago Mercantile Exchange (CME), Nasdaq, New York Mercantile Exchange, FTSE, Electronic Communications Networks (ECNs), liquidity pools, such as those operated by POSIT and LIQUIDNET, and others.

In providing the functions described herein, the backend servers 105 include processors that operate in accordance with software, firmware or other computer program stored on a computer readable medium, such as read only memory, hard disks (e.g., in a RAID configuration), tape drives, flash memories, optical disks, network storage or other known or hereafter developed technology. The servers 105 (and the processors thereof) may be configured to operate in accordance with software, which may be configured or organized to comprise various functional components or modules. In addition to those components of electronic trading systems and communication systems generally known to those skilled in the art, servers 105 may include an accumulate/distribute engine (or module(s)) 115, including order generation module(s) 115*a* and record update module(s) 115*b*. The servers 105 may also include one or more order routing components 110 and smart router components 120. In general, the order routing components 110 provide the functionality to intercept the orders transmitted by the trader terminals 130 and received by the servers 105 and the accumulate/distribute engine 115 generally provides the functionality to take the individual large block orders and generate multiple scale orders based on the scale order parameters (e.g., via the order generation module(s) 115*a*). The smart routing components 120 route the scale orders to the electronic marketplaces 140.

In performing the functions and operations described herein, servers 105 also access records and data in computer memory, such as random access memory, hard disks (e.g., in a RAID configuration), tape drives, flash memories, optical disks, network storage or other known or hereafter developed technology. By way of example, backend servers 105 include or are in communication with electronic database 125. As will be apparent to those skilled in the art based on the description herein, database 125 may comprise a relational database having multiple related tables. In the present embodiment, database 125 stores order parameters typically stored in electronic trading systems and may include an account table, marketplace tables, a positions table and an accumulate/distribute order table.

In general, the account table stores information that identifies each market participant account, as identified by a unique account identifier (ID), and the associated market participant, including, for example, contact information, bank information, trading limits and any other information deemed relevant, as well as an indication of the traders (and the associated trader terminals 130) trading under each account. For example, the system 100 may store limits restricting traders to trade in specific marketplaces and/or at specific times. Each trader terminal 130 may be identified by a unique terminal ID and/or Internet protocol (IP) address, and each trader may be identified by a unique user name and/or password, which the trader uses to log into the trader terminal 130 and/or system 100. The backend servers 105 may use the terminal ID and the user name/password to identify and associate incoming orders as being transmitted by a particular trader terminal 130 and/or trader, to process orders and to send outgoing messages to the appropriate trader terminal 130. The account holders and traders may include, for example, retail and individual investors, institutional investors, banks, market-makers, broker-dealers, or other entities.

One or more marketplace tables may include details regarding each of the marketplaces 140, as identified by unique marketplace ID, such as contact and routing information, trading schedule and other information.

The database 125 may also include one or more tables for storing account and trader positions. Such tables may include an indication of the aggregate positions in each security for each trader and account. The database 125 may also include (based on accumulate/distribute component order IDs) the quantity traded for each separate component order, both as placed, as well as filled. By tracking the quantity filled at each price, the servers 105 can provide information to operators of the system 100 and the traders at the terminals 130 on each order/trade and aggregate position and account information (e.g., as in the summary window discussed below). This also allows flexibility in determining the commission to be charged (e.g., on each component order or on the overall accumulate/distribute order).

Figure 2A:
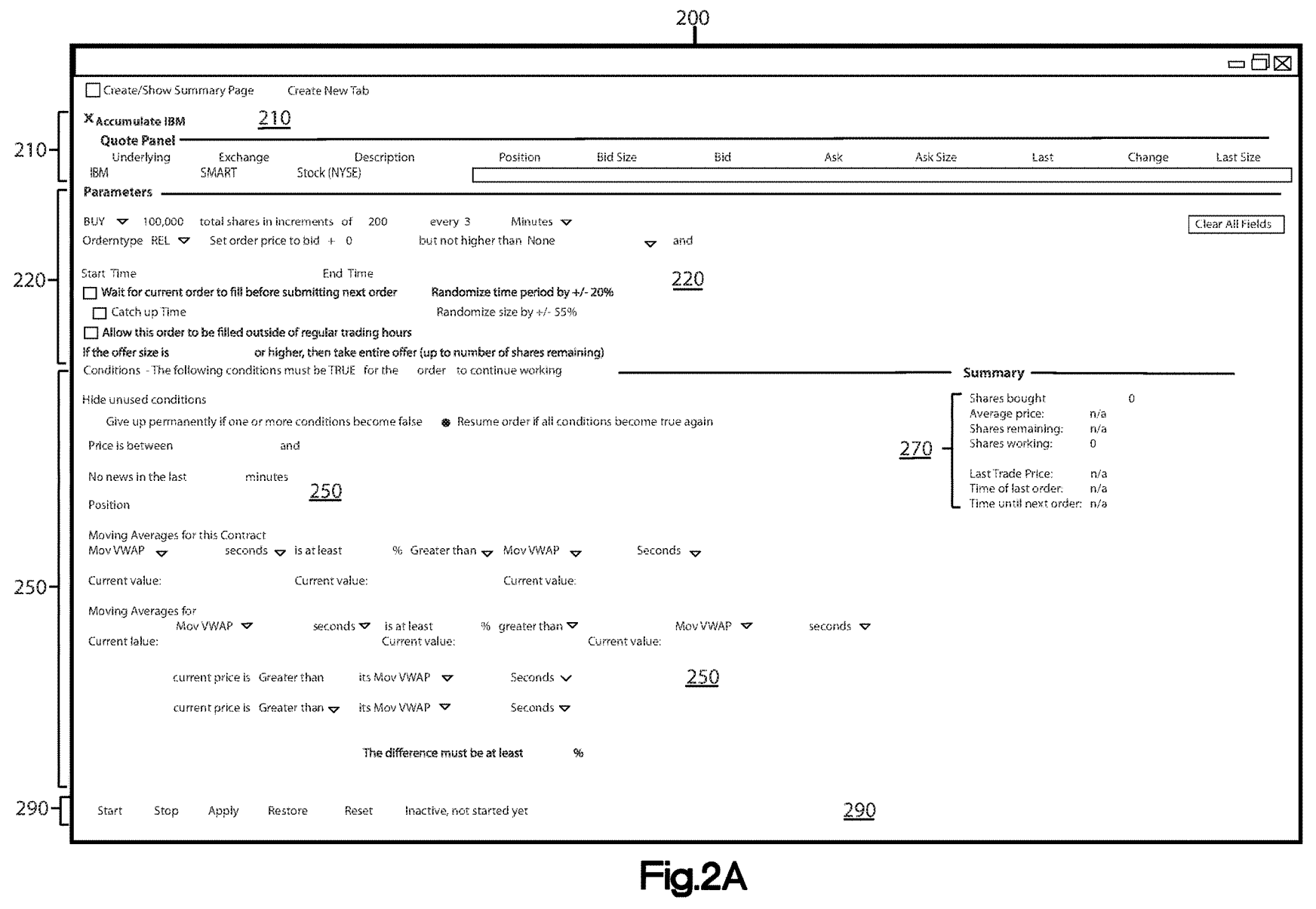

Database 125 may also include one or more tables for storing trade and order details. For example, the database 125 may include an accumulate/distribute trade order table, which associates orders with traders and/or accounts. Each order may have a unique associated order ID. The same (or one or more other tables) may include the order parameters associated with each accumulate/distribute order, as identified by order ID, such as those parameters illustrated in FIGS. 2*a-c*, discussed below. Such tables may also track order parameters not necessarily provided by the trader, such as the status of each order (for example, whether it is open or filled or to be cancelled or revised) and the details associated with the placing of the order (for example, the particular electronic marketplace 140 on which the order is placed, the time of the order and other details).

It should be understood that the foregoing tables are merely illustrative, and that more or less information may be stored and tracked by the servers 105 and/or system 100 as may be desired. Furthermore, such data may be stored in any grouping and in any number of databases and/or tables, including storing any of the information remote from the servers 105, such as at the trader terminals 130. Additionally, rather than storing all information, certain information may be generated in real time based on other information available to the system 100.

It should also be recognized that the computer systems described herein, such as the trader terminals 130, servers 105, electronic marketplaces 140 and market data provider systems 150, generally include one or more computers that are programmatically structured, to perform the functions required to manage their operations, as described herein. One skilled in the art will recognize that the computer systems may, as a matter of design choice, include any number and configurations of discrete computers and electronic databases, which may be used separately or in tandem to support the traffic and processing needs necessary in operation at one time. In one embodiment, the backend servers 105, if multiple servers are used, are configured using a round-robin configuration to handle trader and/or electronic marketplace. Although not depicted in the figures, the one or more computers of the computer systems generally include such components as are ordinarily found in such computer systems, including but not limited to processors, RAM, ROM, clocks, hardware drivers, associated storage, and the like.

Figure 2B:
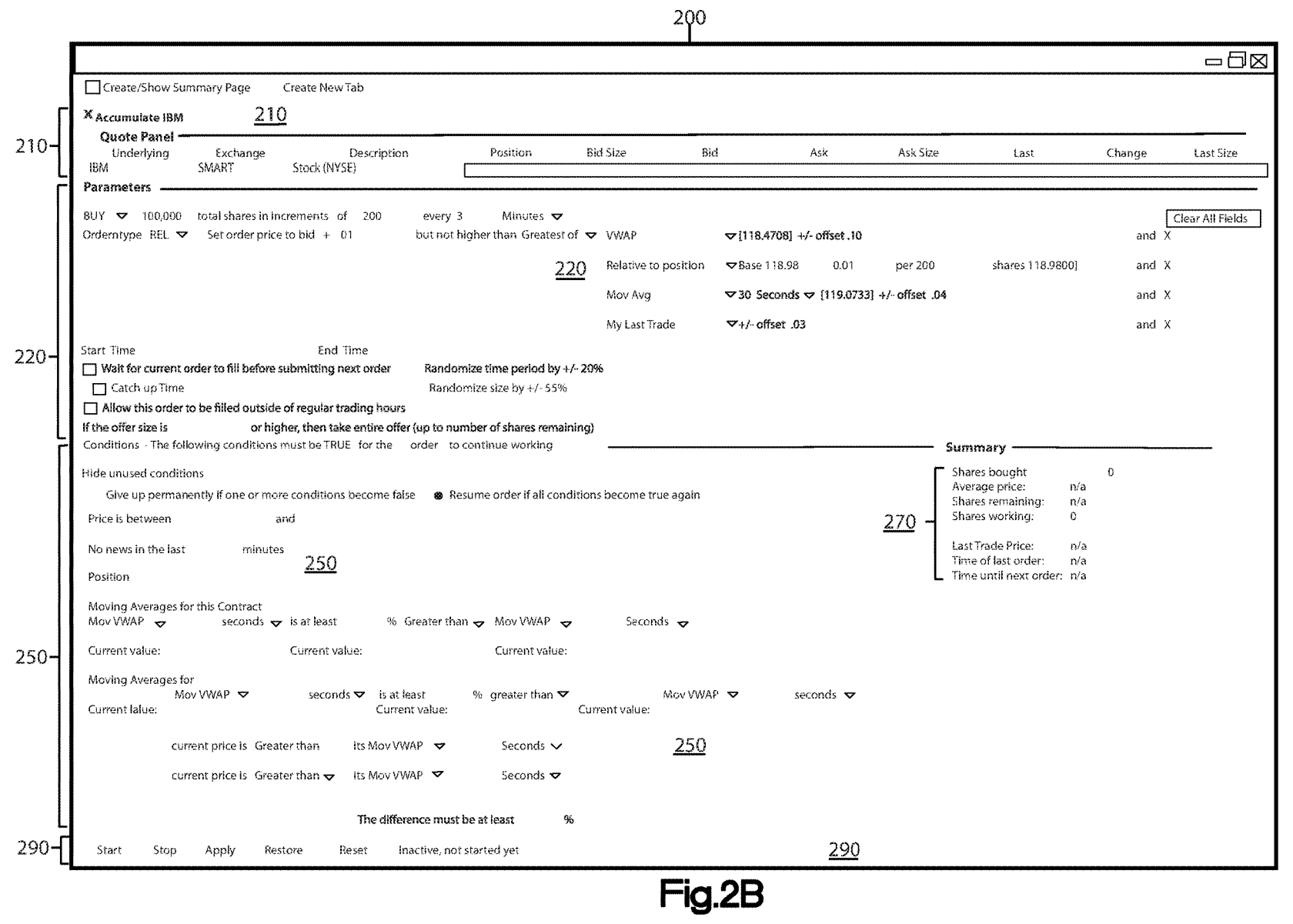
Figure 2C:
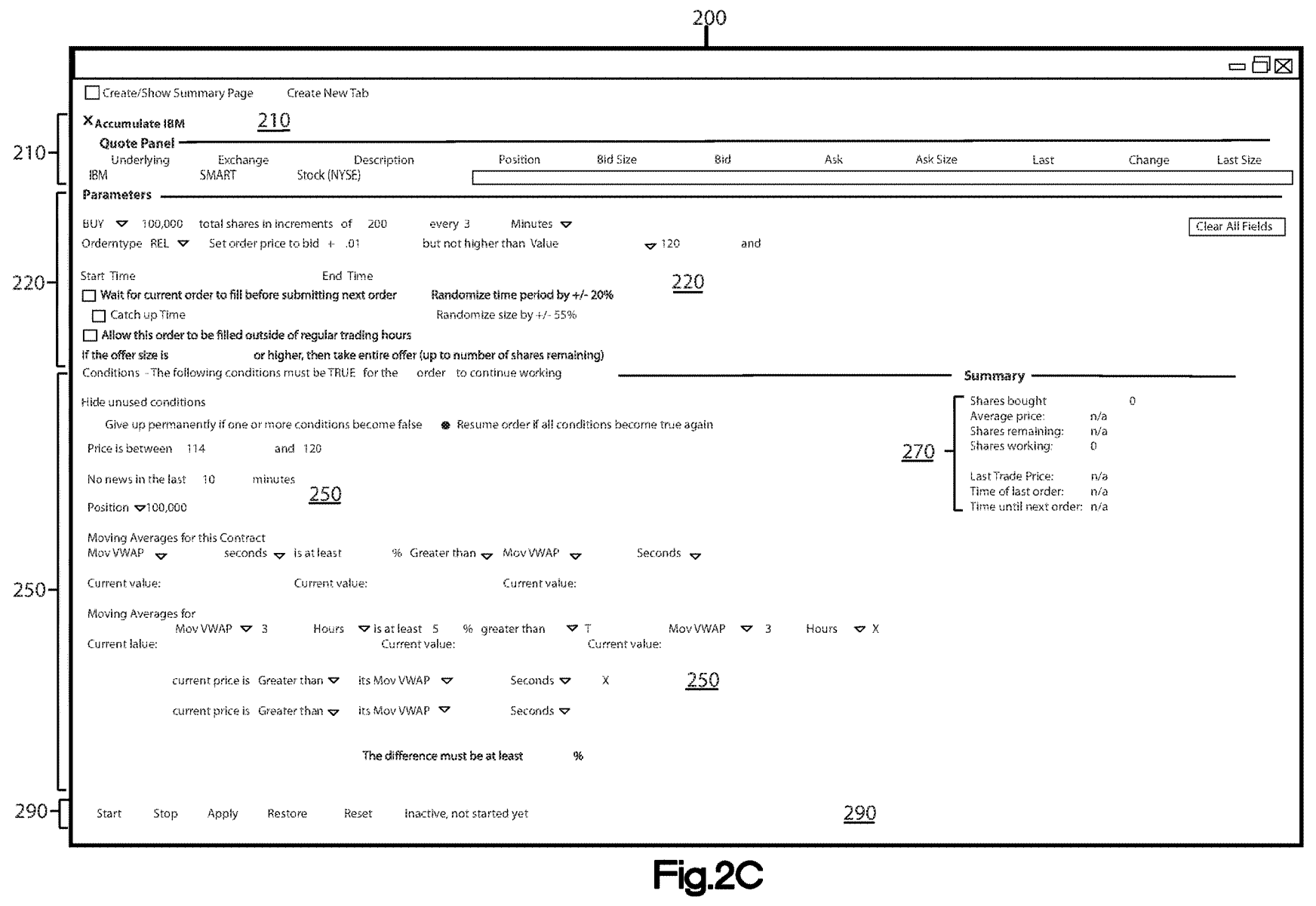

In general, each trader terminal 130 may be a programmed general purpose computer, special-purpose computer or other computing device (such as a PDA or other mobile device) that operates according to software, firmware or other program stored on a computer readable medium to provide the functions described herein. For example, each trader terminal 130 may be programmed to provide a number of graphical user interfaces (GUIs) to the traders such that traders can interact with and use the functions provided by system 100 and servers 105. These GUIs may include order entry tickets (as shown in FIGS. 2*a-c*), order tracking screens, account or position information, pricing tables, charts, market data and other information desired by the trader or received or stored by the system 100. In the present embodiment, the trader terminal 130 is a Java-based GUI that packages information and transmits it to the servers 105 as an extension of the FIX protocol, and receives information from the servers 105. In certain embodiments the software or other programming residing in the computer readable medium at the trader terminal 130 provides the functionality otherwise provided by the servers 105; for example, that of the accumulate/distribute engine or presenting the trader with the order tickets, receiving the trader inputs, including the order parameters and conditions disclosed herein, evaluating the parameters and conditions, generating the component orders and transmitting them (e.g., in the FIX protocol) to the electronic marketplaces 140 and/or servers 105, and tracking the order progress etc. in a local version of the database. Thus, as will be appreciated by those skilled in the art, the servers' 105 performing functions and procedures as descried herein may be replaced in alternate embodiments with the trader terminal's 130 performing such functions and procedures. In alternate embodiments, the GUI is generated by the backend servers 105, for example, by an interface software component or module residing in memory. In such an embodiment, the backend servers may further include a web server for providing the GUI and the system may operate generally as an application service provider (ASP).

Furthermore, each of the servers 105, trader terminals 130, electronic marketplaces 140 and market data provider systems 150 described herein may have a network connection over which each communicates with the other components as described herein. The network connection may be a gateway interface to the Internet or any other communications network through which the systems can communicate with other systems and user devices. The servers 105 may communicate with each of the other types of components over the same network, such as the Internet, or over separate networks, such as the Internet, WANs, LANs, VPNs or other communication link. Network connection may connect to the communications network through use of a conventional modem (at any known or later developed baud rate), an open line connection (e.g., digital subscriber lines or cable connections), satellite receivers/transmitters, wireless communication receivers/transmitters, or any other network connection device as known in the art now or in the future. It will be understood by those skilled in the art that the display of user interfaces and the provision or display of information to a user may be accomplished within the scope of the present invention in a number of ways, including, but not limited to, the serving or pushing of interfaces to a user, exposing one or more application programming interfaces (APIs) to the trader terminals 130, and the local storing and/or generation of interfaces at a trader terminal 130 upon a trigger received from the servers 105 or input from the trader at the trader terminal 130. Also, the backend servers 105 may communicate with the trader terminals 130 and electronic marketplaces 140 using any protocol or format. In certain embodiments, the computer systems involved preferably communicate using a messaging system in which information be communicated is contained within one or more messages, which may be packetized, encrypted or formatted, as necessary to address specific bandwidth or security concerns. The messages may use XML or other message types and may be based off of one or more message standards, such as FIX in the financial industry, or be based on a proprietary protocol or format.

It will be understood that reference to a "connection," "communication" or "link" is not intended to mean that the various computers be in constant connection or communication, but rather be capable of communication upon establishment of a connection. For example, a trader terminal 130 may from time-to-time "connect" to servers 105 using an unsecured Internet connection to check market prices or related information.

As noted above, each trader terminal 130 may operate in accordance with software (for example, residing in local ROM) to provide the trader with a graphical user interface (GUI). As illustrated in FIGS. 2*a-c*, the GUI may include an accumulate/distribute order ticket 200 alone or among any of a number of different trading related options. In general, the accumulate/distribute order ticket 200 provides an interactive means for a trader to input details regarding accumulate/distribute orders, including the order parameters and conditions. Notably, the system 100 permits entry of a comprehensive set of parameters and conditions not previously available to or practical for traders, whether trading manually or via an electronic system, let alone in the form of a single order ticket, as in the present embodiment.

In the embodiment of FIGS. 2a-c, the order ticket 200 includes a quote panel 210, parameters panel 220, conditions panel 250, summary panel 270 and control panel 290, although additional or fewer panels (and/or information) may be presented. Information entered by the trader via the terminal 130 is ultimately transmitted to the servers 105, stored in the database 125 and used in placing, tracking and settling the orders and resultant trades.

In general, the quote panel 210 provides information related to the particular security that is the subject of the order being entered, in the present example, shares in IBM. Such relevant information may include an indication of the underlying security (IBM), an exchange on which it is traded and information on the current trading in the security, such as the bid and ask sizes, current bid and ask prices, as well as the last traded price, price change and trade size. The quote panel may also include, based on information stored in the database 125, the trader's position in the particular security.

The illustrative parameters panel 220 generally includes parameters defining the accumulate/distribute order, as well as the individual component orders. In the example, parameter panel 220 includes an indication of the direction of the order, namely whether the order is a buy (accumulate, as in the present example) or a sell (distribute), the symbol of the security being traded (IBM).

The order ticket 200 also includes various fields for the trader to input the accumulate/distribute trade parameters relating to size and price. In this regard, the order ticket 200 includes the following fields: total block order size, which indicates the aggregate number of shares of the security to be traded or the maximum position to be accumulated (or distributed) in all component trades (100,000 in the present example) and the increment, or component order, size (e.g., 200), which indicates the base number of shares in each order component. The present embodiment further includes an option to permit the system 100 to randomly alter the size of each component order by up to a certain amount (which may be predefined or trader-specified), for example, by constantly increasing or decreasing the size by up to 55% (e.g., placing a component for up to 310 shares or as little as 90 shares, although in certain embodiments, the size is rounded to the nearest 100-unit lot). As will be appreciated by those skilled in the art, the servers 105 track the actual size of each component in the electronic database 125. As will also be appreciated, permitting the randomization of the size makes tracking the overall accumulate/distribute order more difficult and thus less susceptible to parasitic traders.

The parameters panel 220 also includes an indication as to the timing of the submission of the component orders, for example, in second, minutes or hours, as measured from the time the previous component order executed or alternatively, was placed. The present embodiment permits the trader to select an option to randomize the submission time of each component order by a certain amount (which, like other variables herein, may be predefined or trader-specified), for example, by up to 20% (e.g., 30 seconds plus or minus 20%, or as infrequent as every 36 seconds or as frequent as every 24 seconds). Because the servers 105 store the time each component was executed (e.g., in the database 125), the servers 105 are able to determine when to transmit the next component order based on the received timing parameter and, if selected, random offset. Like the randomized price feature, the randomized timing feature makes tracking the overall accumulate/distribute order more difficult for a third party to track.

The parameters also include an indication of the type of order, namely whether the order is to be a limit, relative or market order (presented, for example, as a pull-down menu, which is indicated throughout by downward arrows). Market orders (MKT) are attempted to be filled at the current market price. Limit orders (LMT) involve the traders setting a limit price with an optional offset amount that must be met or bettered for the order to be filled. Relative orders (REL) can be used to add liquidity to the market by placing a bid or offer that is more aggressive than the current best bid or offer, by setting an optional offset amount, and specify a cap. Embodiments of the invention, when used with relative order types, can allow a trader to buy or sell at better prices if such prices are at or inside the NBBO. The quote adjusts automatically based on the trader's selection of parameters (as discussed below) as the market moves.

More specifically, with regard to relative orders, the parameter panel 220 allows the trader to select, for buy (accumulate) orders, to use the bid price plus any offset amount (which could be 0), which is indicated in the GUI order ticket 200 as "Offset from bid," and for sell (distribute) orders, to use the ask price minus any offset amount (which could be 0), which is indicated in the GUI as "Offset from ask." This field is only visible for REL orders only and works with the "Set limit price" field, discussed below.

For relative and limit orders, the order ticket 200 also includes a "Set limit price to" field, which sets the price cap for each component order, which for relative orders works in conjunction with the price calculation set in the aforementioned "offset" field. For market orders this field does not display. The system 100 presents traders with the following options (for example, as selected via a pull-down menu) to ensure the limit price will not be set (for a buy) higher than or (for a sell) lower than any one or more of the corresponding amounts:

None: For relative but not limit orders, this sets no cap on the price.

Value: This opens a field (e.g., window) for the trader to set an absolute limit price.

Bid: The bid price, plus or minus an optional (i.e., trader-specified) offset amount (e.g., entering zero for no offset; entering a negative value can be interpreted by the servers 105 as indicating a minus offset).

Ask: The ask price, plus or minus an optional offset amount (e.g., entering zero for no offset; entering a negative value can be interpreted by the servers 105 as indicating a minus offset).

Last: The last traded price, plus or minus an optional offset amount (e.g., entering zero for no offset; entering a negative value can be interpreted by the servers 105 as indicating a minus offset).

Volume weighted average price (VWAP): The VWAP plus or minus an optional offset amount (e.g., entering zero for no offset; entering a negative value can be interpreted by the servers 105 as indicating a minus offset).

Moving VWAP: The moving VWAP over the past particular time period (as set by the trader or in alternate embodiments, a predetermined time period) plus or minus an optional offset amount (e.g., entering zero for no offset; entering a negative value can be interpreted by the servers 105 as indicating a minus offset).

Moving Average (Mov Avg): The moving average (of the current security) over the past particular time period (as set by the trader or in alternate embodiments, a predetermined time period) plus or minus an optional offset amount (e.g., entering zero for no offset; entering a negative value can be interpreted by the servers 105 as indicating a minus offset).

Exponential moving average (Exp Mov Avg): The exponential moving average (of the current contract) over the past particular time period (as set by the trader or in alternate embodiments, a predetermined time period) plus or minus an optional offset amount (e.g., entering zero for no offset; entering a negative value can be interpreted by the servers 105 as indicating a minus offset).

My Last Trade: The price of the last component trade in the particular accumulate/distribute trade, which can be shown as the "Last Trade Price" in the order Summary panel 270. As will be appreciated based on the present disclosure, this value cannot be used for the limit price alone since it would have no price for the first trade.

Relative to size traded: Calculates the price cap as equal to a trader-defined base price minus (for a buy order) a trader-defined offset value, per a trader-specified number of shares relative to the total size traded in the accumulate/distribute order, which can be reflected in the "Shares bought" field of the Summary panel 270. For example, if the trader sets base price at $5.50 and the offset at $0.02 per 100 shares, the cap price for the first 100-share component order, where Size Traded=0, would be $5.50. Assuming the trade continues to execute in 100-share increments, the price cap would change as follows: Size Traded=100 and cap=$5.48; Size Traded=200 and cap=$5.46; Size Traded=300 and cap=$5.44, etc. A similar operation is applied to sell orders, with the price cap decreasing by the offset value.

Relative to position: Calculates the price cap the same as the Relative to size traded option, except that the calculation is relative to the trader's overall position (as tracked in the database 125, not just the position in the accumulate/distribute trade), while the Relative to size traded option is relative to the size traded in only the accumulate/distribute trade (as separately tracked in the database 125).

Thus, for example, FIG. 2b illustrates an accumulate order for IBM comprising relative buy component orders setting the price at the bid plus $0.01, but no greater than the greatest of: $0.10 greater than the moving average over a two hour window (the current value being $118.4708, as received by the servers 105 from the electronic marketplaces 140); a base price of 118.98 minus $0.01 per each 200 shares in the trader's total position in IBM; the bid price plus $0.02; the moving average over a 30 second window, plus a $0.04 offset; and the price of the trader's last trade in this accumulate order, plus $0.03. As an alternative to setting the limit price at the "Greatest of" the selected price options, the trader may select (e.g., via a pull-down menu) "Least of," which would set the limit price at no more than the lowest of the selected price options.

In the present embodiment, the parameters panel 220 gives the trader other options, including permitting the trader to set the start time for the orders to be placed, which by default is set to the current time, or to the next open if the electronic marketplaces 140 are closed at the time the order is received by the servers 105. In operation, the servers 105 compare the entered start time to the then current time and, if the entered start time parameter is equal to or before the then current time, the order is placed (assuming the other conditions are met). The trader may similarly enter the end time for the accumulate/distribute component orders to be placed, which by default, is set to the marketplace 140 closing time of the current day or the next day if the accumulate/distribute trade is started after regular trading hours.

The parameters panel 220 also presents the trader (e.g., via a radio button or check box) with the option to wait for the current component order to fill before submitting the next component order. If selected, the next component in the accumulate/distribute trade will be held by the servers 105 until the current outstanding component order quantity fills. If this option is selected, then the servers 105, which count down the time between orders based on the time increment set by the trader (in this example, 30 seconds), suspends the countdown until the last component is filled. Once the prior order fills, the next component order is submitted once the specified time interval has elapsed (and the other conditions are met).

A "catch up in time" option is also provided, which when selected causes the servers 105 to place the next component order essentially immediately (subject to a minimum delay of e.g., two seconds) after the current order fills, disregarding the trader-specified time interval and/or the trader-selected option of waiting to submit a subsequent component order until the prior component order was filled, if the component orders "fall behind." The servers 105 determine that the component orders have "fallen behind" if one or more component orders are not placed or filled within the time increment specified by the trader. As illustrated in FIGS. 2a-c, in certain embodiments, the "catch up in time" condition may be available only when the "wait to fill" condition is selected and otherwise unavailable, shown grayed-out. Using the parameters of FIG. 2c, by way of example, if the first component order is placed and filled but the second order is not placed for over three minutes because the price was outside the limit (e.g., $121), then, assuming the price is below the limit thereafter and the conditions are true, the servers 105 will place two orders for 200 shares each, or in certain embodiments, a single component order for 400 shares. Missed orders are tracked in the database 125 and can be displayed in the Summary panel 270.

The trader also has the option to select a parameter for permitting trading outside normal trading hours, or to select different trading venues. The option to trade outside normal trading hours may be applied on an order-by-order basis or to multiple ones of a trader's orders. Upon the trader selecting the option to trade outside normal trading hours for a particular order, the system may set a flag in the database denoting the selection of such option.

Additionally, the trader is given the option to select a parameter for placing an order for up to the entire remaining amount of shares (which the servers 105 determine based on comparing the total accumulate/distribute size parameter against the aggregate number of shares filled, as updated and stored by the servers 105 in the database 125) if the size offered in the marketplace 140 is equal to or above a trader-specified amount and all other parameters and conditions are satisfied. In the present embodiment, such an order is placed as an "immediate-or-cancel" (IOC) order.

Features of the parameters panel 220 can be summarized with reference to the example of FIG. 3. As illustrated therein, the trader has specified parameters that the servers 105 interpret as an accumulate/distribute trade to buy 5,000 shares of the security (also sometimes referred to generically as a contract) in increments of 200 every 25 minutes. The price is set to the current best bid plus two cents, with a cap on the order price at no higher than the ask price (currently $118.6900) minus one cent. The trade components are to be placed at 12:13:33 PM EST on Aug. 10, 2009, until 20:00:00

(or 8:00:00 PM) on Aug. 10, 2009. The servers 105 will wait for the current order to fill before submitting the next order, and if the trade falls behind, the servers 105 will place orders to catch up in time by submitting orders immediately after a fill instead of honoring the time interval and instead of waiting for the prior component order to fill. Subject to catching up in time, the servers 105 will also randomize the time intervals of order submission by adding or subtracting 20% of the specified time interval of 25 minutes, and randomize the order size (of 200) by adding or subtracting 55% on each order, rounding to the nearest 100 to ensure no odd lots. The orders are permitted to be traded outside regular trading hours, and if the ask size is 600 or higher, the servers 105 will place an order, subject to the other parameters, to take the entire offer, subject further to the trader's original total order quantity (here, 5,000 shares).

It is to be understood that the aforementioned order parameters are merely illustrative, and other parameters are within the scope of the present invention. For example, rather than having a single size for all components, the components may be of different sizes. Also, although a single price is described, it is within the scope of the present invention to provide the trader with greater flexibility in setting the price increments, including setting a different price increment for one or more of the different order components. In alternate embodiments the trader may also set different price caps for one or more of the component orders. Furthermore, the trader may be given the option to select a particular marketplace 140 and/or to trade at specific time(s). Still further, certain of the parameters may be pre-set in the system; for example, by default, the time increment between component orders and/or the size of each component order may be randomized.

In general, the conditions panel 250 provides the trader an interactive interface for setting conditions precedent to placing and/or executing the component orders. In the present embodiment, the servers 105 will not place an order if all selected conditions are not met and, after an order is placed, will attempt to cancel the order if any of the selected conditions are no longer met. In the present embodiment all of the conditions are optional, but if the trader selects a condition, each field associated with the condition is mandatory, and the servers 105 will not accept the order ticket 200 without them. Illustrative conditions will now be discussed.

One option permits the trader to define a price range within which the security price must stay for the order to continue working.

Another option permits the trader to stop the trade from working if a news story pertaining to the security is released (e.g., as received by the system from a data provider 150, such as Google News, Yahoo! Headlines and the Reuters subscription service) within a trader-specified time period (e.g., in minutes), thereby reducing the likelihood that the price movement will be affected by news stories. In other words, until there has been no relevant news for the defined time period, the trade will not work. In certain embodiments, the trader may specify the relevant data providers against which this condition is measured. It should be understood that this optional condition stopping an order from working may be based on news stories having various levels of relevance or connection to the particular security being traded. For example, the order ticket 200 may present a drop down menu allowing the trader to select news stories pertaining directly to the security being traded, or more broadly, to the sector or industry to which the security or company underlying the security pertains, or even more broadly, to the market in general (e.g., news stories pertaining to unemployment, inflation, etc.). To implement this option, when news is received from the data providers 150, the trader workstation 130 or servers 105 may, for example, scan each news story for reference to the security or, based on a look-up table correlating securities and industries/sectors, scan the news story for reference to the appropriate industry or sector.

The system 100 also gives the trader the option via the conditions panel 250 to specify that its position in the security, which the system 100 tracks in the database 125, and which can be displayed in the position column of the quote panel 210, must be greater than or less than (e.g., as set by a pull-down menu) a specified value. This acts as a floor or ceiling for the position. In the present embodiment, not only will the servers 105 not place a particular component order if the position condition is violated, but it will not fill any order that would violate the conditions (i.e., an order whose execution would cause the total position to exceed the trader's "greater than" limit). The servers 105 achieve this by comparing the sum of the trader's total position in the security, as stored in the database 125 and the quantity of each component order, with the specified position condition amount, adjusting the order size of a component order as appropriate.

The conditions panel 250 also permits the trader to set options related to the moving averages for the security. More specifically, the conditions panel 250 includes fields that permit the trader to select one of several types of moving averages, and specify that it have a certain relationship to the same or another type of moving average for that security. These moving averages can include moving VWAP, moving average, exponential moving average or average over the past trader-specified time window. The trader can specify that the first moving average be at least a trader-specified percent greater than or less than the second moving average. In an alternate embodiment, the conditions panel provides a similar condition that allows the trader to specify that the difference between two moving averages for the security is greater or less than a trader-specified amount.

The conditions panel 250 also provides the trader with the option to set conditions that compare two moving averages, which could be for the same security or for one or two different securities, and which could be for the same time period or for different time periods (alternatively, the trader can compare indexes). The trader selects a security, type of moving average and time period as with the prior option, and then selects a second security (which could be the same as the first), type of moving average (which could be the same as the first) and a time period (which, if the security and type of moving average are not the same as the first ones specified, could be the same as the first time period). Like the prior option, the trade specifies that the first average is at least a trader-specified percentage greater or less than the second average. In an alternate embodiment, the system 100 permits the trader to specify a minimum difference between the two moving averages.

The conditions panel 250 also provides the trader with the option to set conditions related to the price of various securities. More specifically, the trader may enter a security, and set as the condition that the price (e.g., last trade, bid or ask) of the security be greater or less than a selected one of its moving averages taken over a trader-specified time window (period). The condition also includes the trader setting the minimum difference (greater or less than)

between the price and the moving average. Furthermore, the option permits the trader to do this for more than one security.

To assist the trader, the servers 105 may calculate the current values of the selected moving averages and the differences thereof based on information received from the marketplaces 140 and/or data providers 150 and cause them to be display as part of the order ticket 200. Similarly, the servers 105 may cause other relevant prices to be displayed as part of the order ticket 200.

As noted above, in the present embodiment, the servers 105 will stop the accumulate/distribute trade orders from working if any of the conditions becomes false (i.e., not met). The present embodiment further provides the trader with options for instructing the servers 105 how to proceed once the conditions become true (i.e., met) again. For example, the trader may select a "Give up permanently if one or more conditions become false" option, which instructs the servers 105 to not place any of the outstanding component orders and a "Resume order if all conditions become true again" option, which instructs the servers 105 to re-submit any cancelled orders and to continue with submitting remaining component orders once the conditions are true again. The trader must select only one of these two options.

FIG. 2c provides one illustrative set of conditions in connection with an accumulate trade to buy 100,000 shares of IBM in increments of 200. As conditions, the trader has specified that: the price of IBM must be between $114 and $120; no news stories have been issued in the prior ten minutes; the trader's total position in IBM be less than 100,000 shares; and the moving VWAP for GE (General Electric) over a three hour window be at least 5% greater than the moving VWAP for T (AT&T) over a three hour window. No conditions regarding the moving average of IBM has been set. In the present embodiment, if, during trading, the conditions become false and then true again, the servers 105 will automatically resume placing the component orders; in alternate embodiments, if the conditions become false, the servers 105 stop working the order unless the trader manually restarts it.

As will be appreciated by those skilled in the art based on the foregoing discussion, the order ticket 200 of the present embodiment presents a trader with an unprecedented ability to trade large orders by having them automatically broken into smaller, constituent component orders. The system 100 permits a robust set of parameters and conditions to be specified by the trader for each large order, which allow the trader to precisely control the working (e.g., creating, submitting, suspending and cancelling) of the order and the constituent component orders, thereby maximizing profit and reducing negative market impact and risk. The ability to randomize both component order size and time between component orders can be particularly effective in minimizing the negative impact of such orders on the market. Moreover, the ability to set multiple parameters and conditions (particularly as part of a single order entry process or single GUI) minimizes human intervention and the potential for human and technical errors.

The Summary panel 270 may display real-time data received and/or generated by the servers 105 to permit the trader to monitor the progress of the accumulate/distribute order. As will be appreciated based on the present disclosure, the servers 105 track the information displayed in the database 125 throughout the progress of the trade, using the values to update the display. The displayed data relates only to the accumulate/distribute order of the displayed order ticket 200; however, in certain embodiments, the trader terminal GUI provides an additional page that displays an aggregate summary for all of the trader's accumulate/distribute orders (e.g., the summary data discussed below for each working (or even suspended or cancelled) order associated with the trader or account). It should also be understood that although the summary data is presented as overlaid on the trade ticket 200 in the present embodiment, in alternate embodiments the summary data may be transmitted to the trader, including at the trader terminal 130 or another device, such as by email or text to a PDA or cell phone. The specific data provided in the illustrative Summary panel 270 is as follows:

Shares bought: This is the total number of shares bought or sold to date in the particular accumulate/distribute order. In addition to the number of shares, the window displays sliding shading proportionate in length to the percent of the order complete.

Average price: This is the average price to date for the completed portion of the order, which the servers 105 may calculate and store each time it receives execution information from a marketplace 140.

Shares remaining: This is the outstanding quantity of shares to be bought or sold in the accumulate/distribute order, calculated by the servers 105 based on the total quantity for the accumulate/distribute order and the aggregate filled quantity tracked in the database 125 by the servers 105.

Shares working: This is the quantity currently working (i.e., aggregate quantity of shares in all outstanding orders).

Last order is: This indicates the status of the last order component as either filled or unfilled, based on a status field or flag maintained by the servers 105 in the database 125 as corresponding to the accumulate/distribute order.

Last Trade Price: This is the price at which the last trade in the accumulate/distribute order filled.

Time of last order: This indicates the time the last order was filled, which the servers 105 note in the database 125 based on execution information from the marketplaces 140.

Time until next order: This is a timer that counts down the time until the next order will be submitted. The servers 105 base this timer on the time parameter set by the trader, subject to any selected randomization option, "catch up" in time option or other condition or parameter.

Missed orders: If the servers 105 cannot place additional component orders because the previous order has not filled or because one or more of the conditions is false, and the Catch up in time option is selected, this counter displays the number of missed orders, as tracked by the servers 105 in the database 125.

Shares deactivated: If a component order is canceled because a condition becomes false or the accumulate/distribute order was stopped by the trader, the number of shares that had been working is reflected here. The servers 105 will place an order for this quantity when the accumulate/distribute order is started again and/or the conditions all become true (unless the "give up permanently" option was selected).

As noted above, the order ticket 200 also includes a control panel 290. Although not required for the placing of the accumulate/distribute trades, the control panel 290 optionally provides various functions in addition to mere transmission of the trade details. More specifically, the control panel 290 includes the following buttons, which when activated (e.g., clicked) by the trader, cause the corresponding function to be implemented.

Start: Once all required fields are complete, the trader may activate the start button, which causes the accumulate/distribute trade details (including the parameters and conditions) to be transmitted and received by the servers 105. In the event the trade is stopped by the trader, the start button becomes active again, and activating the button causes the servers 105 to continue with the trade where it left off. Once an order is stopped, the servers 105 update the status for that order in the database 125. When receiving a "Start" message, which includes an indication (e.g., ID) of the associated accumulate/distribute order, the servers 105 update the status of the order in the database 125 from 'stopped' to 'active,' which causes the servers 105 to proceed with generating and submitting component orders based on the stored order details and other information, such as shares already executed, amount of outstanding orders, etc.

Stop: This button becomes active once the trade is started, and activating it causes the servers 105 to cease the trading of the accumulate/distribute trade, for example, canceling any outstanding component orders and not submitting any further orders. For ease of presentation and understanding, the operation of the system 100 in response to the "Stop" instruction is not addressed in connection with the flow diagrams discussed herein; however, in operation, the servers 105 receive the instruction and, once interpreting it as a "Stop" instruction associated with a particular accumulate/distribute order (as identified by an ID contained in the transmission), check the status of component orders related to the accumulate/distribute order and, for each outstanding/pending component order, send a cancellation message to each of the appropriate marketplaces 140. The servers 105 also change the status of the accumulate/distribute order in the database 125 to indicate that it is stopped, thereby preventing further component orders from being submitted. The servers 105 further update the database 125 accordingly, including with the cancellation (or, if too late, execution) of the outstanding orders.

Apply: Activating this button causes any changes to the order ticket 200 to be entered and transmitted to the servers 105, which update the database 125 records associated with the accumulate/distribute trade (for example, as identified by a unique ID assigned by the servers 105 and contained in the transmitted message). For ease of presentation and understanding, the operation of the system 100 in response to the "Apply" instruction is not addressed in connection with the flow diagrams discussed herein; however, in operation, the servers 105 receive the instruction and, once interpreting it as a "Apply" instruction associated with a particular accumulate/distribute order (as identified by an ID contained in the transmission), check the status of component orders related to the accumulate/distribute order and, for each outstanding/pending component order, send a cancellation message to each of the appropriate marketplaces 140. The servers 105 further update the database 125 accordingly, including with the cancellation (or, if too late, execution) of the outstanding orders. The servers 105 update the database 125 with the new parameters and conditions and proceed to issue new component orders, if required, as discussed herein.

Restore: Activating this button cancels any potential changes to an existing trade being entered prior to activating the "Apply" button, and restores in the displayed order ticket 200 the prior values (which had been saved in the database 125).

Reset: If the accumulate/distribute trade is stopped, either because it has finished working or because the trader has manually stopped it, the servers 105 cause the "Reset" button to be active. Activating the Reset button will discount all prior progress of the trade and restart the trade from the beginning (i.e., as if no shares had been accumulated or distributed. This is in contrast to activating the "Start" button, which resumes the trade from where it left off. For ease of presentation and understanding, the operation of the system 100 in response to the "Reset" instruction is not address in connection with the flow diagrams discussed herein; however, in operation, the servers 105 receive the instruction and, once interpreting it as a "Reset" instruction associated with a particular accumulate/distribute order (as identified by an ID contained in the transmission), essentially duplicate the accumulate/distribute order parameters, thereby discounting (i.e., ignoring) the prior trading activity on the accumulate/distribute order, and restart the order essentially as a new order. In one embodiment, the servers 105 receive the reset instruction with the ID of the previously working accumulate/distribute order (which had been stopped), and based on the ID, identifies and copies the order details (including parameters and conditions) for that ID and associates them with a new accumulate/distribute order (and ID). In an alternate embodiment, the Reset message is sent with the order details (including parameters and conditions), and the servers 105 treat it like a new accumulate/distribute order, assigning an ID and creating the appropriate records in and updating the database 125.

Also part of the control panel 290 is a "Status" text field, which indicates the current status of the accumulate/distribute order shown on the order ticket 200 (e.g., inactive, not yet started, active and trading, active and waiting due to false conditions, completed). Such status is tracked/updated by the servers 105 in the database 125 in a field associated with the accumulate/distribute order (e.g., as identified by a unique ID).

It should be understood that order ticket 200 is merely illustrative. For example, fewer or greater details may be inputted and collected depending on the flexibility desired to be provided to the trader. In this regard, the system may set the size of the initial or all components, the price increment (or a minimum and/or maximum price increment), as well as other details. The order ticket need not include data entry fields, but may provide the trader with the option to select from predefined details, such as one of many potential component sizes, price increments and/or profit offsets. The order ticket may also include a feature that allows a trader to create a template or otherwise copy the parameters and conditions for one accumulate/distribute order for the purpose of creating additional accumulate/distribute orders in different stocks. For example, when a trader selects this option, when the servers 105 receive the trader input reflecting selection of this option, the servers 105 read the relevant order records in the database 125 and use the data stored for the parameters and conditions to re-populate new order records in the database 125. One or more separate template records may also be created and stored in the database 125 for storing the template or default parameters and conditions.

Furthermore, the order ticket 200 is merely illustrative of the means for a trader to input order details, and other such means are within the scope of the present invention, including a voice recognition system, which automatically prompts the trader to speak the order details and converts the voice inputs to an electronic message or system inputs. Such voice recognition and computerized data entry devices need not be physically located at or under the direct control of a trader.

As noted above, the system 100 of the present embodiment includes trader terminals 130 and one or more backend servers 105, each of which operates in accordance with software, firmware, or other computer program stored on computer readable medium to achieve the functionality and implement the processes described herein. In this regard, the functionality and processes of the present embodiment will be described in greater detail with reference to FIGS. 4 and 5a-d and continuing reference to FIGS. 1-3. As noted above, certain alternate embodiments of the invention provide for the logic and processing to be resident at trader terminals 130, not the servers 105. Thus, in certain alternate embodiments, each trader terminal 130 may be programmed to access the relevant data (either locally or remotely stored in electronic memory), determine whether the parameters and conditions are met and generate the summary panel 270, instead of the servers 105, as discussed above. Similarly, although the following discussions of FIGS. 4 and 5a-d reference the servers 105 performing various functions, it is to be understood that in alternate embodiments, each trader terminal, either alone or in conjunction with the servers 105, may perform such function.

Turning first to FIG. 4, the general process of order creation and execution will now be described. In general, the steps of the flow chart of FIG. 4 appearing on the left are those performed at or by the trader terminals 130, those illustrated in the center are performed at or by the backend servers 105, and those illustrated on the right are performed at or by the electronic marketplaces 140. As an initial step (not illustrated), an account holder opens an account with the provider of the system, providing the account details, the backend servers 105 create the appropriate records in the database 125 for the account and the account holder obtains one or more trader terminals 130, which as noted above, may be a special purpose computer or programmed general purpose computer. Once the account is opened and the trader is authorized to trade, the trader creates the order, including setting the type of order and parameters (step 405) and conditions (step 410) via the order ticket 200. Once the trade details, including parameters and conditions, are set, the trader submits the trade (e.g., by activating a "start" button on the order ticket), and the trader terminal 130 transmits the order details (including the parameters and conditions and their various options) to the backend servers 105 (step 415).

The backend servers 105 receive the order details (step 420) and update the database 125 (step 425). Such updating of the database 125 may include creating records containing the trade details and associating such details with a particular trader and account. Such updating may also include determining and storing each of the particular accumulate/distribute order components, although the backend servers 105 may determine the various details of the components in real time, based on the order details and not separately store records for the individual components. The backend servers 105 proceed to determine if the conditions are true (i.e., satisfied) and generate the order (step 430) and, if so, submit the necessary component(s) to the electronic marketplaces 140 and update the database 125 (step 435). If the conditions are not true, then the servers 105 send a message to the appropriate electronic marketplaces 140 to cancel any outstanding orders (step 440) and (based on the trader having selected the option for trading to resume rather than "give up permanently") waits for the conditions to be true (step 445).

Once the backend servers 105 transmit an order to a particular electronic marketplace 140, electronic marketplace 140 receives the order (step 445) and proceeds to execute the order by matching it against a contra order (step 450). Electronic marketplace 140 then creates an electronic record (step 455) reflective of the execution of the order and transmits the indication that the order has been executed to the backend servers 105.

The backend servers 105 receive the indication that the component order has been executed and updates the database 125 (step 460), including noting the trade details, such as the quantity and price at which the trade was filled, and changing the status of the order to "filled." The backend servers 105 then transmit an update to the appropriate trader Terminal(s) 130 (step 465), which updates the display (step 475), and the servers 105 determine whether an additional order needs to be placed to complete the trader's total order (step 470). As discussed in greater detail herein, this determination of whether there are additional component orders to be placed includes determining whether aggregate of the filled and submitted component orders is equal to the total size of the accumulate/distribute order, which is stored in the database 125. If additional orders are to be placed, then the servers 105 generally repeat the process by determining if the conditions are true (step 430). If no additional component orders need to be placed to completely fill the original order, then the order is completed, and the servers 105 wait for another order (step 480).

As noted, when the servers 105 receive execution information from the electronic marketplaces 140, the servers 105 also generate a message containing such execution information and, for example, based on the trader terminal ID or IP address associated therewith, transmit the execution information to the trader terminal 130 from which the order was received. To reduce necessary bandwidth, the messages transmitted from the servers 105 to the trader terminal 130 may include the trader ID and execution information, such as price and size, as well as an indication the accumulate/distribute order to which the execution information belongs, rather than all details necessary to define the order. For example, each message may include an identifier indicating that the execution details relate to a particular one (i.e., first, second, etc.) component of a particular accumulate/distribute order, thereby allowing the message to be made relatively smaller. Upon receipt of the information, the trader terminal 130 extracts the information and updates the local view presented to the trader in the trader terminal GUI (step 475).

Having thus described the general operation of the system 100, illustrative processes of evaluating the parameters and conditions in connection with generating and submitting the component orders will now be described in greater detail with reference to FIGS. 5a-d.

Figure 5A:
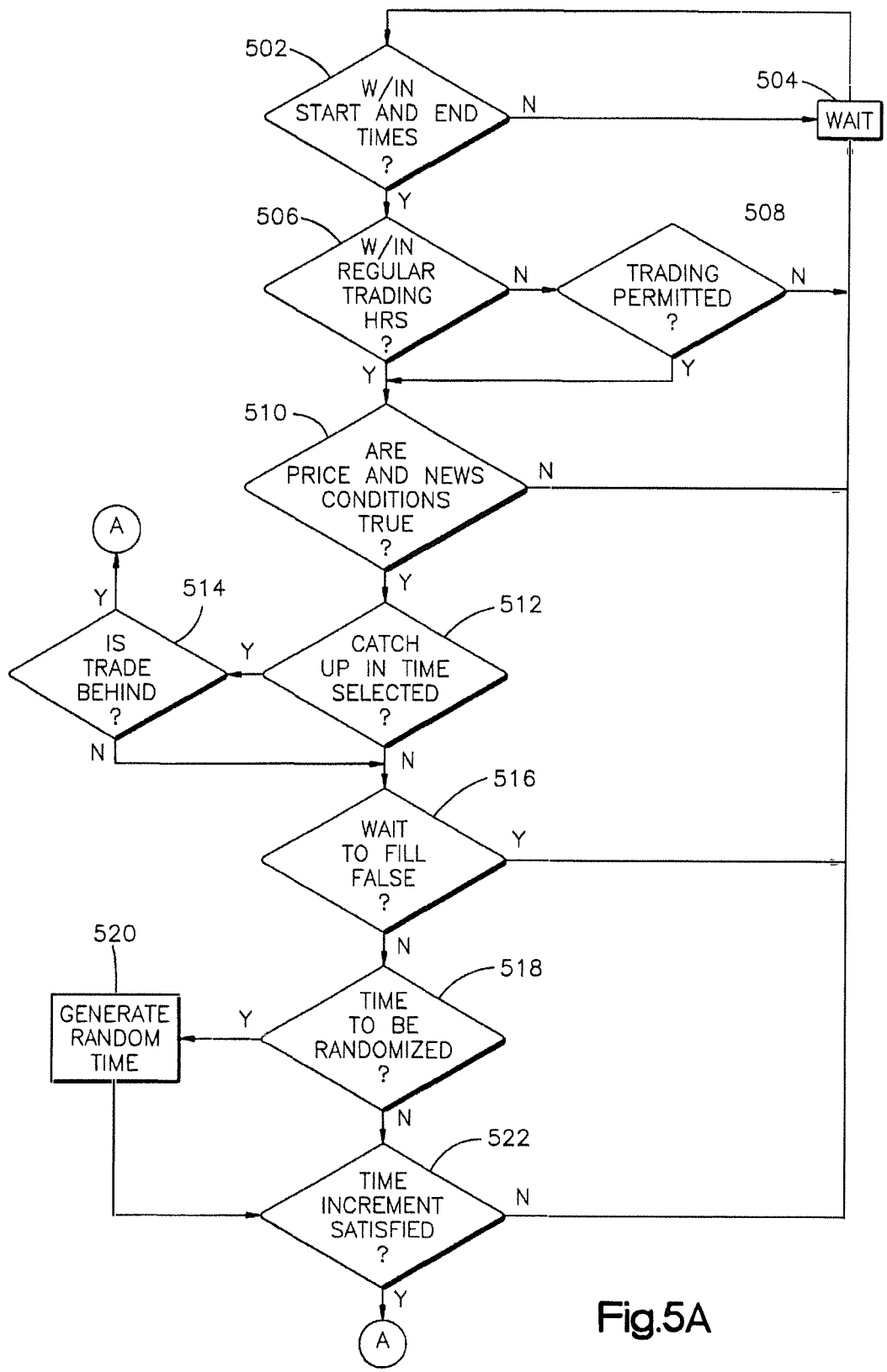
FIGS. 5a-d are flow diagrams of processes of generating orders in accordance with various embodiments of the present invention.
Figure 5B:
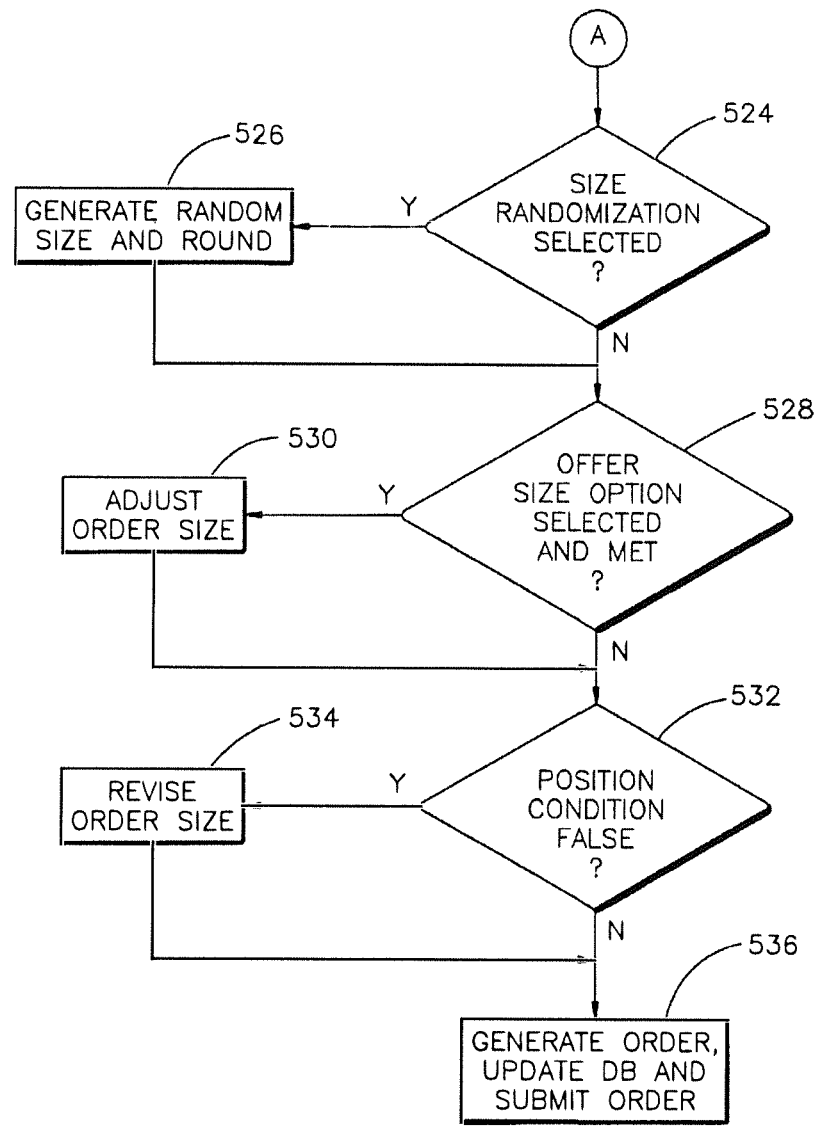

Turning now to FIGS. 5a-b, once the order is created, to submit the component orders, the servers 105 must determine whether the actual time is within the start and end times for the particular order, for example, as stored in the database 125 (Step 502). If the time is not within such values, then the servers 105 wait (step 504) for the start time and/or for another order. Also with regard to timing, the servers 105 determine whether the actual time is within normal trading hours (step 506) and, if not, whether the trader has selected the parameter to permit trading outside normal trading hours (step 508). If these timing determinations are not satisfied, then the system waits (step 504).

If the timing determinations are satisfied, then the servers 105 proceed to determine whether the other parameters, such as the price and news parameters and conditions, are true (step 510). If not, the servers 105 wait to submit any component orders (step 504). As will be understood based on the present disclosure, the servers 105 essentially continuously circulate through the parameters and conditions during the period the order is working (e.g., valid), ensuring each remains true and suspending or cancelling the order and its component orders upon any becoming false.

If the parameters and conditions are true, the servers 105 determine (e.g., by checking the appropriate field in database 125) whether the trader has selected the "catch-up-in-time" parameter, discussed herein (step 512). If this parameter is selected, the servers 105 determine whether the order is behind (step 514). As discussed above, an order is "behind" if fewer component orders actually have been submitted due to parameters or conditions not being met or because the system was waiting for component orders to fill before placing the subsequent component order, than would have been submitted based only on the selected time between component orders. If the order is behind, then the servers 105 ignore the selected time between component orders and proceed with the process (at A) (for example, placing the next component order as soon as the prior component order fills).

If the order is not behind or the catch-up-in-time parameter is not selected, the servers 105 then check (i.e., by accessing and reading the relevant database record and field) whether the "wait-to-fill" parameter has been set (step 516). If this parameter has been selected, the servers 105 check the status of the last component order in the database 125, which would have been updated based on the acknowledgment received from the appropriate marketplace 140. If the wait-to-fill parameter was selected and the last component was not filled, then the servers 105 wait to submit the next component order (step 504).

If the wait-to-fill parameter is true (i.e., satisfied), the servers 105 continue by considering the time between component orders. For example, the process may continue with determining whether the "randomize time between component orders" parameter has been selected (step 518) and generating the random time interval (step 520). Regardless of whether the time is to be randomized, the servers 105 proceed when the time increment between component orders is satisfied (step 522), as may be determined based on noting in the database 125 the time each component order is submitted and calculating the increment based on such saved data.

The servers 105 also determine whether the trader selected the parameter option to randomize the size of each component order (step 524) and if so, generate a random size within any specified limits (step 526). If the randomized size option is not selected, then the servers 105 simply generate the size of the component order based on the other parameters, subject to the following size determinations.

If the trader has selected the parameter option to take an entire offer if the size is above a particular limit (as discussed above) (step 528), then the servers 105 adjust the size of the component order to reflect the then current offer (step 530). Regardless of whether the offer-size option is selected, prior to finally determining the size of the component order, the servers 105 also determine whether any condition related to position would become false if the component order was executed at the currently calculate size (step 532). For example, if the trader has a limit of holding a particular number of shares of a given security (which would be reflected in database 125), the servers 105 would compare that limit to the sum of the current position in that security and the size of the component order to be submitted. If the sum is greater than the limit, then the servers 105 downwardly revise the size of the component order so that the position condition is not violated (step 534). With the size of the component order having been determined, the servers 105 then cause the component order to be generated in the appropriate format and submitted, updating the database 125 to reflect the component order (step 536). Once a component order is submitted, the servers 105 may continue by waiting a predetermined amount of time or move directly to determining whether another component order should be generated and submitted.

In the present embodiment, when the servers 105 are required to wait before submitting a component order, the process indicates that all preceding steps and determinations are repeated. While this helps ensure all parameters and conditions remain satisfied prior to submitting a component order, it should be understood that the process need not start from the beginning. It should also be understood that the various processes and steps described herein may be implemented in any number of different manners, including in different orders. For example, although in the flow illustrated in FIGS. 5*a-b* the servers 105 determine the appropriate timing for placement of the component order prior to determining the appropriate size of the component order, the order of these steps could be reversed.

Figure 5C:
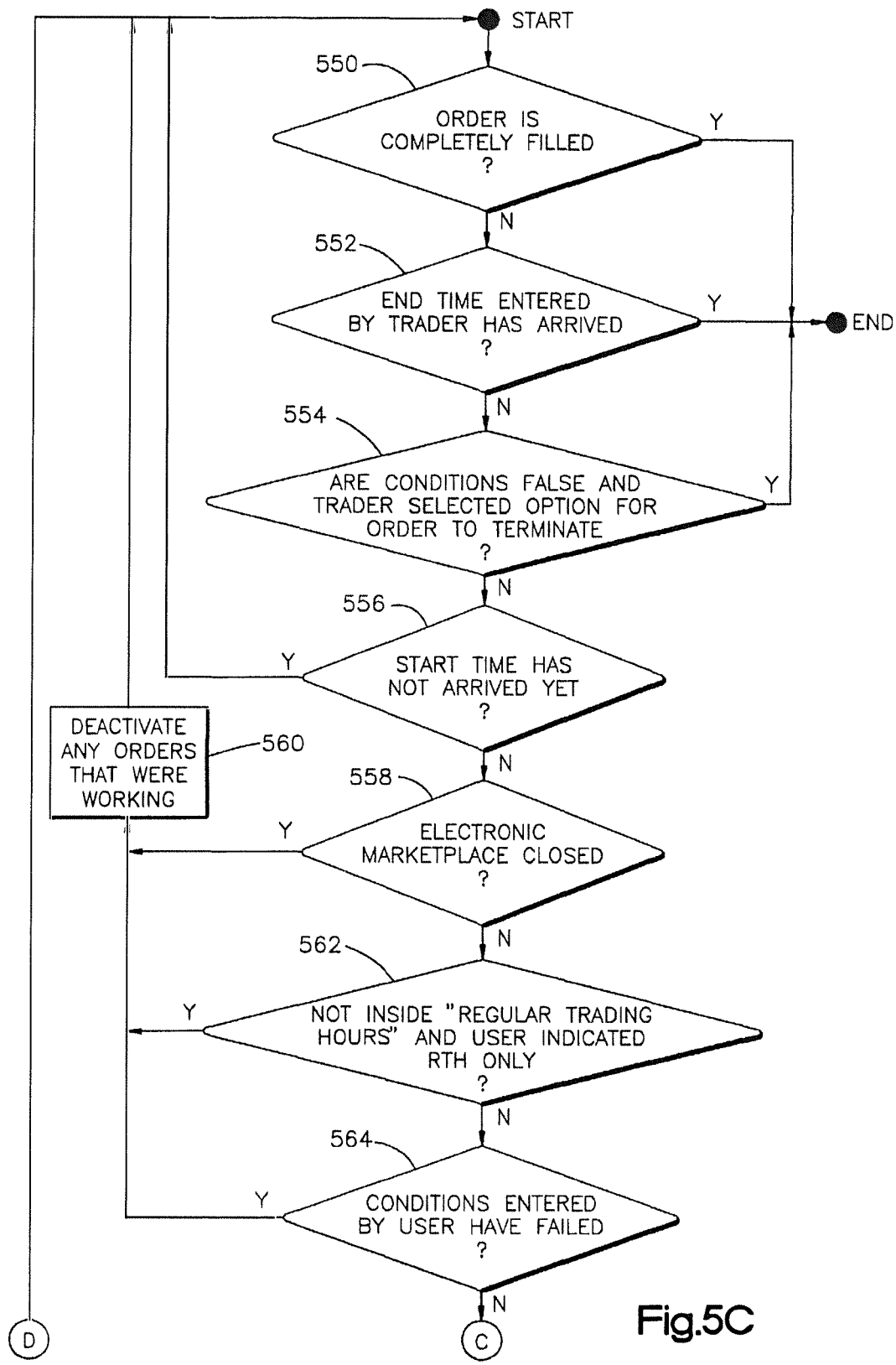
Figure 5D:
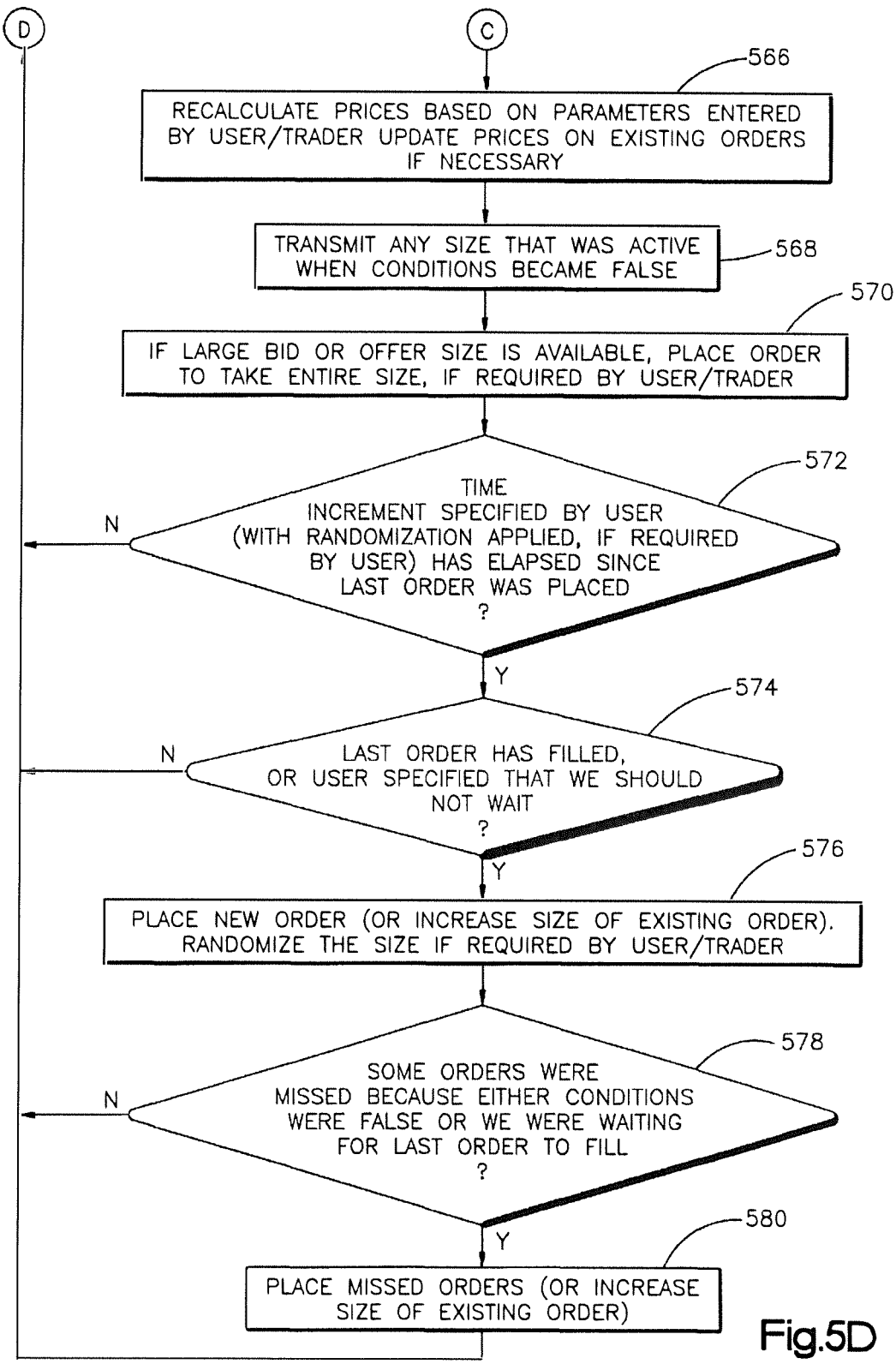

By way of further example, FIGS. 5*c-d* illustrate an alternative process for generating and submitting component orders. In general, the processes involves the servers 105 or, as noted above, the trader terminal 130 in alternate embodiments looping through a series of calculations, determinations and acts. As illustrated, the process may begin with determining whether the order currently being worked is completely filled or has one or more component orders to be submitted (step 550); whether the trader-specified end time for the order has been reached (step 552); and whether the trader-specified conditions are "false" (i.e., have failed or are not satisfied). If the order has been completely filled, or if the end time has been reached, or if the conditions are false (and the trader has selected the option for trading to cease upon a condition being false, then the process ends for that particular order.

If the order has not been filled, the end time has not been reached and the conditions are satisfied, then the process of generating the component order(s) proceeds with determining whether the trader-specified start time for trading the order has been reached (step 556). If the start has not been reached, then the process loops back to the start, essentially waiting for the start time to be reached. If the start time has been reached, the system determines whether the electronic marketplace(s) 140 are closed (step 558). If so, the system proceeds to deactivate any pending component orders (step 560) by identifying the pending orders by their status in the database 125 and sending the appropriate message to electronic marketplace 140 identified in the database as associated with each pending order.

If the electronic marketplace is not closed, then the process continues with a determination of whether the then current time is outside regular trading hours (RTH) and whether the trader has, for this order, not permitted trading outside of RTH (step 562). If the time is outside RTH and trading outside RTH is not permitted, then the process proceeds with deactivating any pending order(s) (step 560).

If the then current time is within RTH or trading is permitted outside RTH, then the system determines whether the conditions for the order are false (step 564). If the conditions are false, pending orders are deactivated (step 560) and, if they are satisfied, then the component order is essentially valid to be generated and submitted. Accordingly, the process then continues with determining price for the component order based on the order parameters (step 566).

In the present embodiment, the system not only calculates the price for the component order to be submitted, but also recalculates the price for any pending, unfilled component orders, revising the orders with the appropriate electronic marketplace(s) 140, as necessary.

Next, if the order had a constituent component order deactivated because the conditions became false and the trader selected the option of permitting trading to restart once the conditions became true again, then a component order having the size of the deactivated component order is transmitted at the determined price, thereby in essence reactivating the previously deactivated component order (step 568). Also, if the trader selected the option (discussed above) to take a bid or offer over a specified size, and such a bid or offer exists, then the order is placed for the entire size (subject to any overall position or other limits) (step 570).

The process continues with a determination as to whether the time increment specified by the trader (as randomized if the trader selected the option to randomize the time between orders) has elapsed since the last component order was placed (step 572). If the time increment has not elapsed, then the process loops back to the beginning; otherwise, the process continues as described below.

Next, the system determines whether the last component order was filled (e.g., by accessing and reading the relevant field or flag in the database) and, if not, whether the trader has selected the option for the trade to continue working despite the last component order not having been filled (step 574). If the last order was not filled and the trader has not opted to permit trading to continue, then the process loops back to the beginning, thereby providing time for the last component order to execute. If the last component order has executed or if the trader has opted to permit a component order to be placed despite an open component order, the process continues with placing the new component order (step 576). In the present embodiment, if the order has a constituent component order already pending, then rather than placing a new order, the system updates the pending component order by increasing the size of the pending order by an amount equal to that of the new component order to otherwise be placed. Regardless of whether a new order is placed or the size of an existing order is increased, the size reflects the trader's selection of the option to randomize the size.

The process continues by determining whether the order is subject to the "catch up in time" option, discussed above (step 578). More specifically, the embodiment determines whether any component orders were "missed" (i.e., if fewer component orders were actually submitted due to parameters or conditions not being met or because the system was waiting for component orders to fill before placing the subsequent component order, than would have been submitted based only on the selected time between component orders). If any component orders were missed, then the process continues with one or more new component orders being placed for a quantity equal to the missed orders at the price as determined during the process, or in certain embodiments, updating a pending order to reflect the additional quantity (step 580).

As will be understood by those skilled in the field, the logical flow of FIGS. 5a-d may be implemented programmatically in several ways. It should also be understood that the servers 105 and/or trader terminals 130 may programmatically determine the currently desired component orders according to different logic. Although not separately identified in the flow charts of FIGS. 4 and 5a-d, it is also to be understood that, as discussed above, orders may be subject to being stopped, cancelled or modified by the servers 105 upon receipt of a "cancel" or "modify" trader input from a trader terminal 130.

It should be emphasized that although various embodiments have been described with reference to an illustrative accumulate/distribute order in which the components are buy orders, it is within the scope of the present invention for the order (and components) to be sell orders.

Embodiments may route orders to the marketplaces 140 in any fashion. For example, orders may be routed to only a single marketplace 140, or to one of multiple marketplaces 140, for example, by randomly selecting the marketplace or using a round-robin or other methodology. Embodiments may use various forms of so-called "smart-routing," in which certain logic is used to select an appropriate marketplace 140. Whether or not smart routing is used, and the degree of processing and logic employed in any such smart routing, is a trade-off among several factors, including the potential for the best price, the processing overhead, speed of execution, bandwidth usage in routing orders and other factors. In one embodiment the backend servers 105 include a smart router component 120 that programmatically configures the servers 105 to continually scan competing marketplaces 140 and automatically seek to route orders to the best market, taking into account one or more factors, such as quote size, quote price, liquidity-taker costs, liquidity-provider rebates and the availability of automatic order execution. In certain embodiments, the trader terminal 130 presents the trader with the ability to select from multiple routing options.

Figure 6A:
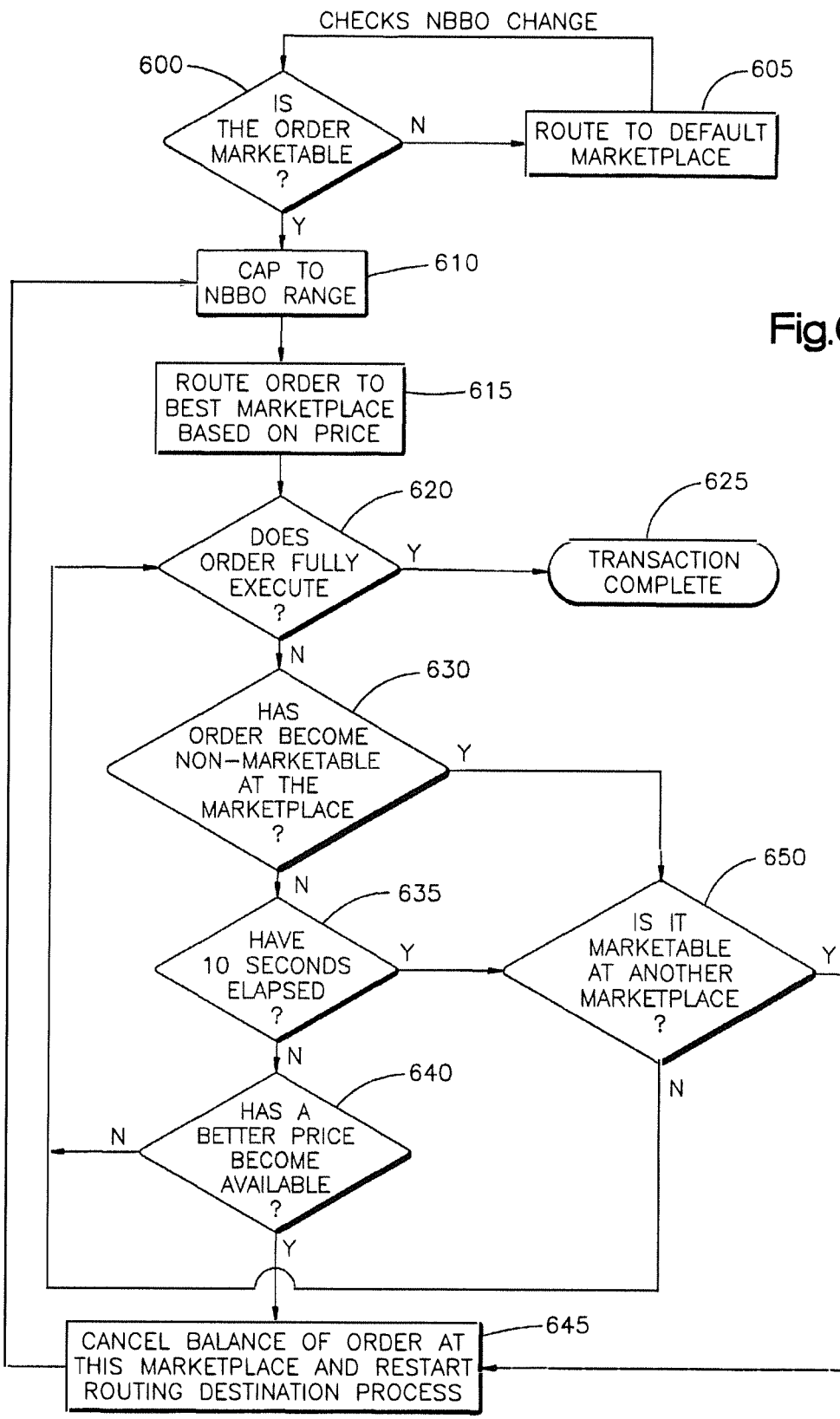
FIGS. 6a-c are flow diagrams of order routing processes according to various embodiments of the present invention.

One illustrative smart routing process flow will now be described with regard to FIG. 6a. As illustrated, the servers 105 determine whether the order to be routed is marketable at marketplaces 140 based on information from the marketplaces 140 (step 600). If the order is not marketable, the servers 105 route the order to a default marketplace 140 (step 605) with the hopes that the order does become marketable, and the servers 105 continue to check the NBBO to determine if the order is marketable.

If the order is marketable, the order is capped to the NBBO range (step 610). The servers 105 then route the order to the marketplace 140 with the best price (step 615). Once the order is routed to a marketplace 140, the servers 105 wait for execution information from the marketplace 140 and, once execution information is received, update the database 125 and determine whether the order was fully executed (step 620). If it is fully executed, then the order is complete (step 625). If the order is not fully executed (i.e., partial fill), then the servers 105 check whether the order has become unmarketable at the particular marketplace 140 to which the order was routed (step 630).

If the order is still marketable at the marketplace 140, then the servers 105 wait a period of time, for example ten seconds, for the order to fully execute (step 635). The servers 105 track the elapsed time by, for example, storing in database 125 the time the order was partially filled (in step 620). Until the time period elapses, the servers 105 determine whether a better price has become available at another marketplace 140 (step 640). If not, then the servers 105 wait for execution of the balance of the order (step 620). If a better price has become available at a different marketplace 140, then the servers 105 cancel the open portion of the order (step 645) and the routing process restarts with the order being capped to the NBBO range (step 610).

If the time period (in step 635) has elapsed without the order executing or if the order became unmarketable at the marketplace 140 (in step 630), then the servers 105 determine whether the order is marketable at another marketplace 140 (step 650). If the order is not marketable at another marketplace 140, then the order remains open at the same marketplace 140 and the servers 105 wait for the balance to execute (step 620). If the order is marketable at another marketplace 140, then the servers 105 cancel the open portion of the order (step 645) and the process continues with the order being capped to NBBO range (step 610).

Figure 6B:
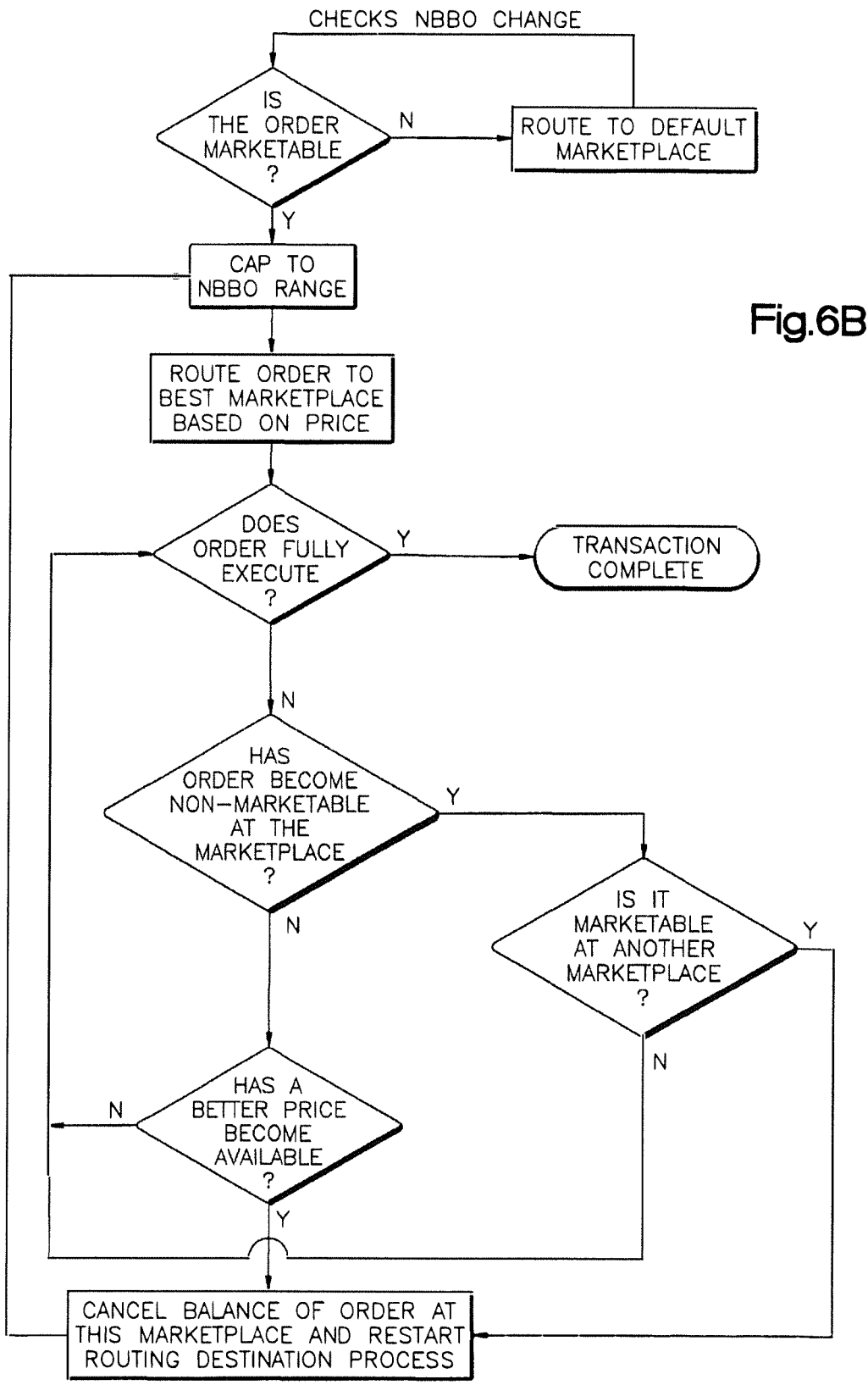
Figure 6C:
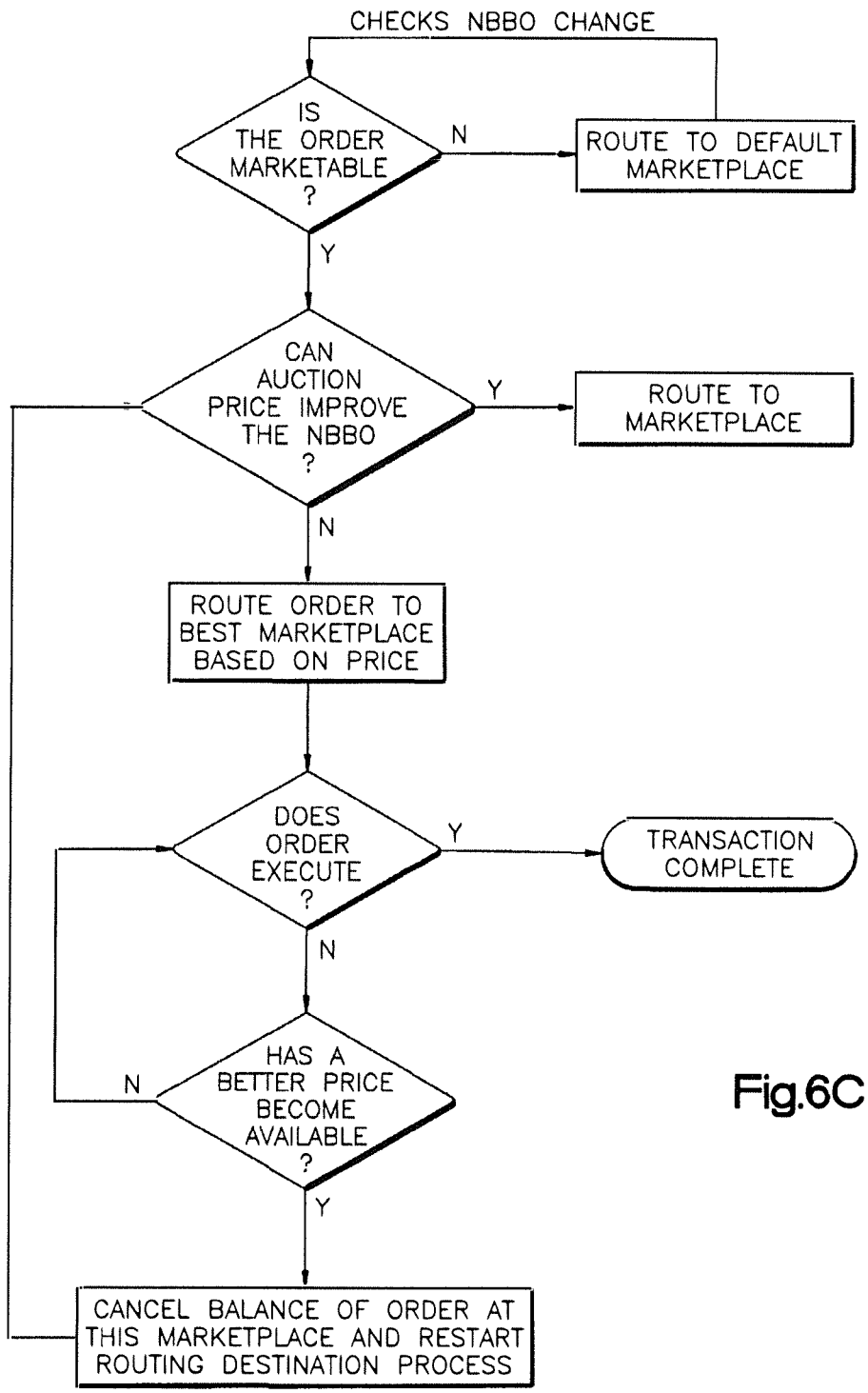

It should be understood that the same or different smart routing process can be used for different types of securities. For example, the foregoing process may be used for United States stocks and bonds and Canadian stocks, and another process (see FIG. 6*b*), for example, one similar to the foregoing but without the steps pertaining to waiting a predetermined time period, may be used for other stocks. Similarly, another smart-routing process (see FIG. 6*c*) (for example, for options) may include, after the initial determination is made that the order is marketable, a determination as to whether an auction price at a marketplace can improve the price and if so, the order is routed to the appropriate marketplace; otherwise, the order is routed to the marketplace with the best price.

While there have been shown and described fundamental novel features of the invention as applied to the illustrative embodiments thereof, it will be understood that omissions and substitutions and changes in the form and details of the disclosed embodiments of the invention may be made by those skilled in the art without departing from the spirit of the invention. In this regard, it should be understood that the same embodiments are merely illustrative, and that the various features and implementations may be combined, interchanged and/or modified.

I claim:

1. A computer system for trading large volumes of securities, the system comprising:
   electronic storage;
   a network connection device configured to communicate with one or more trader terminals, one or more electronic marketplaces, and one or more data provider systems; and
   one or more computing devices in communication with the electronic storage and the network connection device, the computing devices configured to:
   receive from a trader terminal an order for a large volume of a security, said large volume order comprising a plurality of order parameters and conditions, the parameters including an order type parameter, an order direction parameter, a total block order size parameter, a component order size parameter, a component order price parameter and a component order time increment parameter, and the conditions including at least one of a condition based on price of the security, a condition based on news pertaining to the security, a condition based on position in the security, and a condition based on price of an-other security; and
   without need for intervention by the trader terminal;
   receive electronic market data from at least one of the one or more electronic marketplaces and the one or more data provider systems;
   store the large volume order and the market data in the electronic storage;
   automatically generate a plurality of smaller, constituent component orders based on the parameters of the large volume order including the total block order size parameter, the component order size parameter and the component order price parameter;
   determine whether the conditions are satisfied based on the market data;
   automatically submit the component orders to the one or more electronic marketplaces sequentially based on the component order time increment parameter when the conditions are satisfied; and
   automatically prevent the component orders from being submitted to the one or more electronic marketplaces when the conditions are not satisfied or a position in the security equal to the total block order size parameter has been obtained.

2. The system of claim 1 wherein the parameters further include a wait-to-fill parameter and wherein the computing devices are further configured to suspend submitting component orders while a previously submitted component order remains unfilled.

3. The system of claim 1 wherein the parameters further include a randomize component order size parameter and wherein the computing devices are further configured to randomize the size of each component order by up to a certain predefined or trader-specified amount.

4. The system of claim 1 wherein the parameters further include a randomize component order time increment parameter and wherein the computing devices are further configured to randomize the time between component orders by up to a certain predefined or trader-specified amount.

5. The system of claim 1 wherein the large volume order further comprises an instruction to give up permanently if one or more conditions become false or to resume submitting the component orders if all the conditions become true again.

6. The system of claim 1 wherein the computing devices are further configured to:
   deactivate pending component orders upon the conditions not being satisfied, the pending component orders being for a quantity of the security, and
   upon the conditions being satisfied after deactivating the pending component orders, cause a replacement component order to be submitted for the quantity.

7. The system of claim 6 wherein the replacement component order is for an amount of the security equal to the quantity plus the component order size parameter.

8. The system of claim 1 wherein the component order price parameter includes an indication of: market price; or both limit price and a limit offset amount; or both relative price and a relative offset amount.

9. The system of claim 1 wherein the condition based on price of the security includes a condition that the price of the security be within a specified range.

10. The system of claim 1 wherein the condition based on price of the security includes a condition that a first moving average for the security is above or below a threshold.

11. The system of claim 10 wherein the threshold is a second moving average for the security.

12. The system of claim 1 wherein the other security is an index.

13. The system of claim 1 wherein the condition based on price of an-other security includes a condition that a moving average for the other security is above or below a threshold.

14. The system of claim 13 wherein the threshold is a moving average for the other security.

15. The system of claim 1 wherein the parameters include a size parameter specifying a quantity of the security and wherein the computing devices are further configured to, in response to a posted bid or offer for the quantity or more of the security, disregard the component order size parameter and take the posted bid or offer.

16. The system of claim 1 wherein the condition based on position in the security specifies that a total position in the security be greater than or less than a specified value.

17. The system of claim 16 wherein the computing devices are further to configured to revise the component order size so that the position condition is satisfied.

18. The system of claim 1 wherein the condition based on news pertaining to the security specifies that no news be received within a specified time period.

19. The system of claim 18 wherein the news references the security.

20. The system of claim 18 wherein the news is indirectly related to the security.

* * * * *